(12) United States Patent
Ootsubo et al.

(10) Patent No.: US 11,795,279 B2
(45) Date of Patent: Oct. 24, 2023

(54) COMPOSITE MATERIAL, PRODUCTION METHOD FOR MOLDED OBJECT, AND PRODUCTION METHOD FOR COMPOSITE MATERIAL

(71) Applicant: Teijin Limited, Osaka (JP)

(72) Inventors: Makoto Ootsubo, Osaka (JP); Takeru Ohki, Osaka (JP); Guofei Hua, Osaka (JP); Akihisa Nomura, Osaka (JP); Shuhei Suzuki, Osaka (JP); Shuhei Onoue, Osaka (JP); Takumi Kato, Osaka (JP); Takashi Toyozumi, Osaka (JP)

(73) Assignee: Teijin Limited, Osaka (JP)

( * ) Notice: Subject to any disclaimer, the term of this patent is extended or adjusted under 35 U.S.C. 154(b) by 261 days.

(21) Appl. No.: 16/767,297

(22) PCT Filed: Nov. 21, 2018

(86) PCT No.: PCT/JP2018/043023
§ 371 (c)(1),
(2) Date: May 27, 2020

(87) PCT Pub. No.: WO2019/107247
PCT Pub. Date: Jun. 6, 2019

(65) Prior Publication Data
US 2020/0369843 A1    Nov. 26, 2020

(30) Foreign Application Priority Data

Nov. 29, 2017 (JP) .................. 2017-229666
Aug. 8, 2018 (JP) .................. 2018-149791

(51) Int. Cl.
*C08J 5/04* (2006.01)
*B29C 70/46* (2006.01)
(Continued)

(52) U.S. Cl.
CPC ............... *C08J 5/042* (2013.01); *B29B 15/10* (2013.01); *B29C 70/16* (2013.01); *B29C 70/46* (2013.01);
(Continued)

(58) Field of Classification Search
CPC .................... C08J 5/042; B29C 70/46
See application file for complete search history.

(56) References Cited

U.S. PATENT DOCUMENTS

2009/0233092 A1    9/2009 Hara et al.
2010/0178495 A1    7/2010 Taketa et al.
(Continued)

FOREIGN PATENT DOCUMENTS

CN    103154336 A    6/2013
CN    104781316 A    7/2015
(Continued)

OTHER PUBLICATIONS

Int'l. Search Report for PCT/JP2018/0043024, dated Jan. 22, 2019.
(Continued)

*Primary Examiner* — Andrew D Graham
(74) *Attorney, Agent, or Firm* — MaxGoLaw PLLC

(57) ABSTRACT

A composite material which includes a thermoplastic matrix resin and carbon fibers A including carbon fiber bundles A1 in which $Li/(Ni \times Di^2)$ satisfies $6.7 \times 10^1$ to $3.3 \times 10^3$, wherein the carbon fibers A have a fiber length of 5-100 mm and have a value of $Lw_{A1}/(N_{A1}ave \times D_{A1}^2)$ of $1.0 \times 10^2$ to $3.3 \times 10^3$, the carbon fiber bundles A1 having an average bundle width $W_{A1}$ less than 3.5 mm and being contained in an amount of 90 vol % or larger with respect to the carbon fibers A A production method for producing a molded object from the composite material is also provided.

15 Claims, 9 Drawing Sheets

(51) Int. Cl.
| | | |
|---|---|---|
| *B29B 15/10* | (2006.01) | |
| *B29C 70/16* | (2006.01) | |
| *B29C 70/50* | (2006.01) | |
| *C08J 5/24* | (2006.01) | |
| *B29K 101/12* | (2006.01) | |
| *B29K 307/04* | (2006.01) | |
| *B29K 77/00* | (2006.01) | |
| *B29K 105/12* | (2006.01) | |

(52) U.S. Cl.
CPC .............. *B29C 70/50* (2013.01); *C08J 5/243* (2021.05); *B29K 2077/00* (2013.01); *B29K 2101/12* (2013.01); *B29K 2105/12* (2013.01); *B29K 2307/04* (2013.01); *C08J 2377/02* (2013.01)

(56) References Cited

U.S. PATENT DOCUMENTS

| | | | |
|---|---|---|---|
| 2010/0304145 A1* | 12/2010 | Yonemoto | C08J 5/24 156/60 |
| 2013/0274413 A1* | 10/2013 | Ozeki | C08K 7/06 427/175 |
| 2013/0295811 A1 | 11/2013 | Shinmen et al. | |
| 2013/0317161 A1* | 11/2013 | Konagai | B29C 70/12 524/495 |
| 2014/0004308 A1* | 1/2014 | Taniguchi | B32B 5/26 428/156 |
| 2014/0039114 A1* | 2/2014 | Hagihara | C08J 5/042 524/495 |
| 2014/0080960 A1* | 3/2014 | Konagai | C08J 5/042 524/495 |
| 2014/0080961 A1* | 3/2014 | Konagai | C08J 5/042 524/495 |
| 2014/0186584 A1* | 7/2014 | Arakawa | B29C 70/46 428/147 |
| 2014/0356612 A1* | 12/2014 | Sano | C08L 23/10 428/300.1 |
| 2014/0370245 A1* | 12/2014 | Nagakura | B29C 70/12 428/189 |
| 2015/0005434 A1 | 1/2015 | Miyoshi et al. | |
| 2015/0031257 A1* | 1/2015 | Ootsubo | B29B 11/16 264/320 |
| 2015/0044455 A1* | 2/2015 | Konagai | C08J 5/042 428/338 |
| 2015/0044470 A1* | 2/2015 | Tomioka | B29C 70/506 524/508 |
| 2015/0152231 A1* | 6/2015 | Ohki | C08J 5/042 524/496 |
| 2015/0158984 A1 | 6/2015 | Sonoda et al. | |
| 2015/0202807 A1* | 7/2015 | Sano | B29C 43/20 428/688 |
| 2015/0203642 A1* | 7/2015 | Sonoda | C08J 5/046 524/495 |
| 2015/0203663 A1* | 7/2015 | Sonoda | C08K 7/06 524/495 |
| 2015/0239182 A1* | 8/2015 | Kosaka | B29C 43/003 524/605 |
| 2015/0292145 A1* | 10/2015 | Sonoda | D06M 15/513 442/60 |
| 2016/0101542 A1* | 4/2016 | Kosaka | C08K 5/29 524/537 |
| 2016/0185922 A1 | 6/2016 | Miura et al. | |
| 2016/0194461 A1* | 7/2016 | Suzuki | C08L 101/00 428/220 |
| 2016/0194468 A1* | 7/2016 | Ogasawara | C08J 5/042 524/495 |
| 2016/0319088 A1* | 11/2016 | Saji | C08J 5/04 |
| 2016/0339669 A1* | 11/2016 | Miyoshi | B32B 5/022 |
| 2017/0008260 A1 | 1/2017 | Fujii et al. | |
| 2017/0106606 A1 | 4/2017 | Toyozumi et al. | |
| 2017/0183465 A1 | 6/2017 | Kawabe et al. | |
| 2018/0001577 A1 | 1/2018 | Onoue et al. | |
| 2018/0134857 A1 | 5/2018 | Sonoda et al. | |
| 2018/0155855 A1 | 6/2018 | Shinmen et al. | |
| 2018/0244875 A1 | 8/2018 | Konagi et al. | |
| 2019/0061201 A1 | 2/2019 | Kosaka et al. | |
| 2019/0153628 A1 | 5/2019 | Shinmen et al. | |
| 2020/0263327 A1 | 8/2020 | Shinmen et al. | |

FOREIGN PATENT DOCUMENTS

| | | |
|---|---|---|
| JP | 2004-142165 A | 5/2004 |
| JP | 2013-049749 A | 3/2013 |
| JP | 2013049150 A | 3/2013 |
| JP | 2013-072042 A | 4/2013 |
| JP | 2013202890 A | 10/2013 |
| JP | 2015140353 A | 8/2015 |
| JP | 2016-027956 A | 2/2016 |
| JP | 2017165082 A | 9/2017 |
| WO | 2007126133 A1 | 11/2007 |
| WO | 2008149615 A1 | 12/2008 |
| WO | 2013115337 A1 | 8/2013 |
| WO | 2014017612 A1 | 1/2014 |
| WO | 2014021315 A1 | 2/2014 |
| WO | 2014021316 A1 | 2/2014 |
| WO | 2015111536 A1 | 7/2015 |
| WO | 2015115225 A1 | 8/2015 |
| WO | 2015163408 A1 | 10/2015 |
| WO | 2016152563 A1 | 9/2016 |
| WO | 2017159264 A | 1/2019 |

OTHER PUBLICATIONS

Int'l. Search Report for PCT/JP2018/0043023, dated Jan. 22, 2019.
Lee T. Harper, et al., A Random Fibre Network Model for Predicting the Stochastic Effects of Discontinuous Fibre Composites, 2007 16th Int'l Conf. on Composite Materials, pp. 1-10.
Office Action issued in corresponding Japanese Patent Appln. No. 2019-557184, dated Feb. 2, 2021.
Office Action issued in corresponding Japanese Patent Appln. No. 2019-557815, dated Feb. 2, 2021.
Article 94(3) Communication issued for EP18882318.1, dated Dec. 11, 2020.
Supplementary European Search Report for EP18882318.1, dated Nov. 30, 2020.
Supplementary European Search Report for EP18883729.8, dated Dec. 4, 2020.
Szpieg, et al., "Reuse of polymer materials and carbon fibres in novel engineering composite materials", Plastics, Rubber and Composites, vol. 38, Jan. 1, 2009 (Jan. 1, 2009), pp. 419-425.
Office Action issued in corresponding Chinese Patent Appln. No. 201880077623.5, dated Sep. 28, 2021.
Office Action issued in corresponding Chinese Patent Appln. No. 201880077597.6, dated Sep. 17, 2021.
Article 94(3) Communication issued for EP18883729.8, dated Dec. 17, 2020.
Notice of Submission of Publication, issued in corresponding Japanese Patent Appln. No. 2021-120408, dated May 24, 2022.
Submission of Publications, issued in corresponding Japanese Patent Appln. No. 2021-120408, dated May 20, 2022.

* cited by examiner (a)          (b)

(a)  (b)

COMPOSITE MATERIAL, PRODUCTION METHOD FOR MOLDED OBJECT, AND PRODUCTION METHOD FOR COMPOSITE MATERIAL

TECHNICAL FIELD

The present invention relates to a composite material containing carbon fibers and a thermoplastic matrix resin, and makes it possible to produce a molded body that achieves both mechanical properties and moldability without bending discontinuous thin carbon fiber bundles when the composite material is produced and when the molded body is produced from the composite material.

BACKGROUND ART

A composite material that uses carbon fibers as a reinforcing material has high tensile strength or a tensile elastic modulus and a small linear expansion coefficient, and thus has excellent dimensional stability, and excellent heat resistance, chemical resistance, fatigue resistance, abrasion resistance, electromagnetic wave shielding properties, and radiolucency. Therefore, fiber reinforced plastic using carbon fibers as a reinforcing material is widely applied to automobiles, sports or leisure, aerospace or space, and general industrial applications.

In particular, a so-called fiber reinforced resin molded body containing carbon fibers and a thermoplastic matrix resin has attracted attention. Since carbon fibers are present in the thermoplastic matrix resin, the fiber reinforced resin molded body has excellent mechanical properties and has attracted attention as a structural member of automobiles or the like.

The fiber reinforced resin composite materials can be molded into an object shape by using press molding commencing with cold pressing, or the like.

Patent Literature 1 describes a composite material produced by supplying a thermoplastic matrix resin to a glass fiber bundle containing 2000 or more single fibers as reinforcing fibers and cutting them into a predetermined length. It describes that, when the (bundled) number of the single fibers constituting the glass fiber bundle is 2000 or less, a minimum unit of a sheet cross-sectional area increases, a probability that fiber bundles overlap each other increases, straightness of the fiber is lost, and particularly elastic modulus is reduced.

Patent Literature 2 discloses a quasi-isotropic reinforced sheet material that is formed by substantially integrating a plurality of chopped semi-prepreg sheet materials in an unimpregnated state.

Patent Literature 3 describes a composite material in which large tow carbon fibers are cut after being opened and divided to reduce mechanical properties and variation in mechanical properties.

Further, Non-Patent Literature 1 describes that some of carbon fiber bundles are opened, and that mechanical properties are improved by containing carbon fiber bundles, partially opened carbon fiber bundles, and single (monofilament) carbon fiber component.

CITATION LIST

Patent Literature

Patent Literature 1: JP-A-2004-142165
Patent Literature 2: JP-A-2016-027956
Patent Literature 3: WO 2017/159264

Non-Patent Literature

Non-Patent Literature 1: "A RANDOM FIBRE NETWORK MODEL FOR PREDICTING THE STOCHASTIC EFFECTS OF DISCONTINUOUS FIBRE COMPOSITES" written by Lee T Harper, Thomas A Turner, and Nicholas A Warrior, 2007

SUMMARY OF INVENTION

Technical Problem

However, in a case of the composite material described in Non-Patent Literature 1 in which the carbon fibers are single fibers (monofilament) or the number of single fibers contained in the carbon fiber bundle is small (carbon fiber bundle is too thin), a lump unit that flows during molding (hereinafter referred to as a flow unit) increases compared in the same carbon fiber volume fraction, and aspect ratios of these flow units are excessively high, so that the carbon fibers are easy to be bent. When press molding of a composite material containing a lot of bent carbon fibers is tried, steric hindrance between the carbon fibers is large, spring back becomes large, and a freedom of molding is impaired.

As a second problem in the invention described in Non-Patent Literature 1, bending of the carbon fibers is easy to occur when molding is performed along with flowing if the carbon fiber bundles contain too few single fibers or too many single carbon fibers even in a case where the carbon fibers contained in the composite material are not bent. (Here, the composite material refers to a material in a state before molding. The composite material is a molding material for producing a molded body. A shape of the composite material is typically a slab.) When the molded body contains the bent carbon fibers generated by flow molding, the molded body is not easily exhibit mechanical properties inherent in the carbon fibers sufficiently compared with the case of containing straight carbon fibers.

Patent Literature 1 discloses an invention in which the number of the single fibers constituting the glass fiber bundle is 2000 or more. As a first problem in the invention described in Patent Literature 1, when the glass fiber bundle is used, since a diameter of the single fiber constituting the glass fiber bundle is larger than a fiber diameter of a common PAN-based carbon fiber, a cross-sectional area of the fiber bundle having the same number of fibers is too large as compared with the case of the single carbon fiber diameter (5 μm to 7 μm). When a fiber form of the glass fiber bundle having a large cross-sectional area is directly applied to the size of the carbon fiber bundle as described above, a breaking load of one bundle is extremely large, an interface between a surface of the carbon fibers and the resin breaks before the carbon fiber bundle breaks, and the carbon fiber bundle cannot exhibit its full potential.

As a second problem of the invention described in Patent Literature 1, when the number of single fibers constituting the fiber bundle is the same, since the cross-sectional area of the glass fiber bundle is larger than that of the carbon fiber bundle, the glass fiber bundle is not easily impregnated to the inside with the thermoplastic matrix resin. Therefore, in the invention described in Patent Literature 1, interface adhesion strength between each of the single fibers present in the glass fiber bundle and the thermoplastic matrix resin tends to be insufficient, and the mechanical properties when the molded body is formed are impaired. However, since fiber strength of the glass fiber is lower than that of the carbon fiber, the glass fiber tends to break before the interface adhesion with the thermoplastic matrix resin breaks. Therefore, when the glass fiber is used, the number of single fibers contained in the fiber bundle which is larger or smaller does not significantly affect strength of the composite material compared with the case of using the carbon fiber.

As a third problem of the invention described in Patent Literature 1, the glass fiber bundle of Patent Literature 1 is planned to have a glass fiber bundle width in a range of 10 mm to 50 mm, but when a composite material is produced with a fiber bundle having a too large bundle width, not only the strength of the fiber bundle cannot be sufficiently exhibited since the aspect ratio of the fiber bundle is too small, but also destruction occurs from the resin since a sea of the resin called as "a resin pocket" is too wide (FIGS. 1 and 2).

Therefore, as described above, the glass fiber bundle used in the invention described in Patent Literature 1 cannot be directly replaced with the carbon fiber.

In the quasi-isotropic reinforced sheet described in Patent Literature 2 or a fiber reinforced resin molded product described in Patent Literature 3 (molded body referred to in the present invention), the bundled number of single fibers constituting the carbon fiber bundle is too large. Therefore, uniformity of the carbon fibers in the molded body is insufficient, stress transmission between the carbon fiber bundles is not performed well, and destruction occurs from the resin part. In addition, since the fiber reinforced resin molded product described in Patent Literature 3 contains a huge fiber bundle called a bonded bundle aggregate, the problem becomes significant, and an appearance defect is easy to occur when the molded body is formed.

Consequently, an object of the present invention is to provide a composite material that achieves higher mechanical properties and moldability.

Solution to Problem

In order to solve the above problems, the present invention provides the following solutions.

[1]

A composite material containing: carbon fibers A including carbon fiber bundles A1 in which $Li/(Ni \times Di^2)$ satisfies $6.7 \times 10^1$ or more and $3.3 \times 10^3$ or less; and a thermoplastic matrix resin, wherein the carbon fibers A have fiber lengths of 5 mm or more and 100 mm or less, $Lw_{A1}/(N_{A1}ave \times D_{A1}^2)$ is $1.0 \times 10^2$ or more and $3.3 \times 10^3$ or less, the carbon fiber bundles A1 have an average bundle width $W_{A1}$ of less than 3.5 mm, and the carbon fiber bundles A1 are 90 vol % or more with respect to the carbon fiber A.

Li: fiber length (mm) of carbon fiber bundle

Di: single fiber diameter (mm) of carbon fibers constituting carbon fiber bundle Ni: fiber number (number) of single fibers contained in carbon fiber bundle $Lw_{A1}$: weight average fiber length (mm) of carbon fiber bundles A1

$N_{A1}ave$: average fiber number (number) of single fibers contained in carbon fiber bundle A1

$D_{A1}$: single fiber diameter (mm) of carbon fibers constituting carbon fiber bundle A1

[2]

The composite material according to [1], wherein $Lw_{A1}/(N_{A1}ave \times D_{A1}^2)$ is $1.3 \times 10^2$ or more and $3.3 \times 10^3$ or less.

[3]

The composite material according to [1] or [2], wherein the carbon fiber bundles A1 have an average bundle width $W_{A1}$ of 2.0 mm or less. [4]

The composite material according to any one of [1] to [3], wherein a flow unit including a part having a diameter of curvature of 2 mm or less is 30% or less with respect to all flow units. However, the flow unit refers to one aggregate of carbon fibers or a single carbon fiber.

[5]

The composite material according to [4], wherein the flow unit including the part having a diameter of curvature of 2 mm or less is 10% or less with respect to all flow units.

[6]

The composite material according to any one of [1] to [5], wherein the carbon fiber bundles A1 have an average thickness $T_{A1}$ of less than 95 μm.

[7]

The composite material according to [6], wherein a coefficient of variation of the average thickness $T_{A1}$ is 5% or more.

[8]

The composite material according to any one of [1] to [7], wherein the carbon fiber A further includes more than 0 vol % and less than 10 vol % of carbon fibers A2 satisfying $Li/(Ni \times Di^2)$ being more than $3.3 \times 10^3$.

[9]

The composite material according to any one of [1] to [8], wherein the composite material further contains carbon fibers B having fiber lengths of less than 5 mm, and the carbon fibers B satisfy $N_B ave < N_{A1} ave$.

$N_B ave$: average fiber number (number) of single fibers contained in carbon fiber B

[10]

The composite material according to any one of [1] to [9], wherein the carbon fiber bundles A satisfy a ratio $BL_{20}/L_{20}$ being less than 1.3, wherein $BL_{20}$ represents an average fiber bundle length of 20 aggregates, and $L_{20}$ represents an average fiber length of the 20 aggregates, the 20 aggregates being selected from aggregates of the carbon fiber bundles A1 obtained from the composite material subjected to an ashing treatment.

[11]

The composite material according to any one of [1] to [10], wherein a spring back amount is more than 1.0 and equal to or less than 3.0.

[12]

The composite material according to any one of [1] to [11], wherein the composite material has a tensile elongation ratio of 5% or more and 40% or less when heated to a moldable temperature.

[13]

A method for producing a molded body, including: heating and softening wherein the composite material according to any one of [1] to [12]; conveying the composite material to a mold; and performing cold press molding.

[14]

The method for producing a molded body according to [13], wherein the composite material has a tensile elongation ratio of 5% or more and 40% or less when heated to a temperature capable of cold press molding.

[15]

The method for producing a molded body according to [13] or [14], further including preforming the composite material after the heating, wherein the cold press molding is performed after the preforming.

[16]
A method for producing the composite material according to any one of [1] to [12], including:
impregnating opened carbon fiber bundles with a thermoplastic matrix resin in advance; and
cutting the opened carbon fiber bundles.

Advantageous Effects of Invention

According to the composite material of the present invention, by considering a proportion of a cross-sectional area of the carbon fiber bundle to an aspect ratio of the carbon fiber bundle, the carbon fibers in the composite material have shapes which are hard to bend and can transmit stress sufficiently. Therefore, the molded body using the composite material of the present invention can achieve mechanical properties (particularly tensile strength and tensile modulus) and moldability higher than the related composite materials.

DESCRIPTION OF EMBODIMENTS

Figure 1:
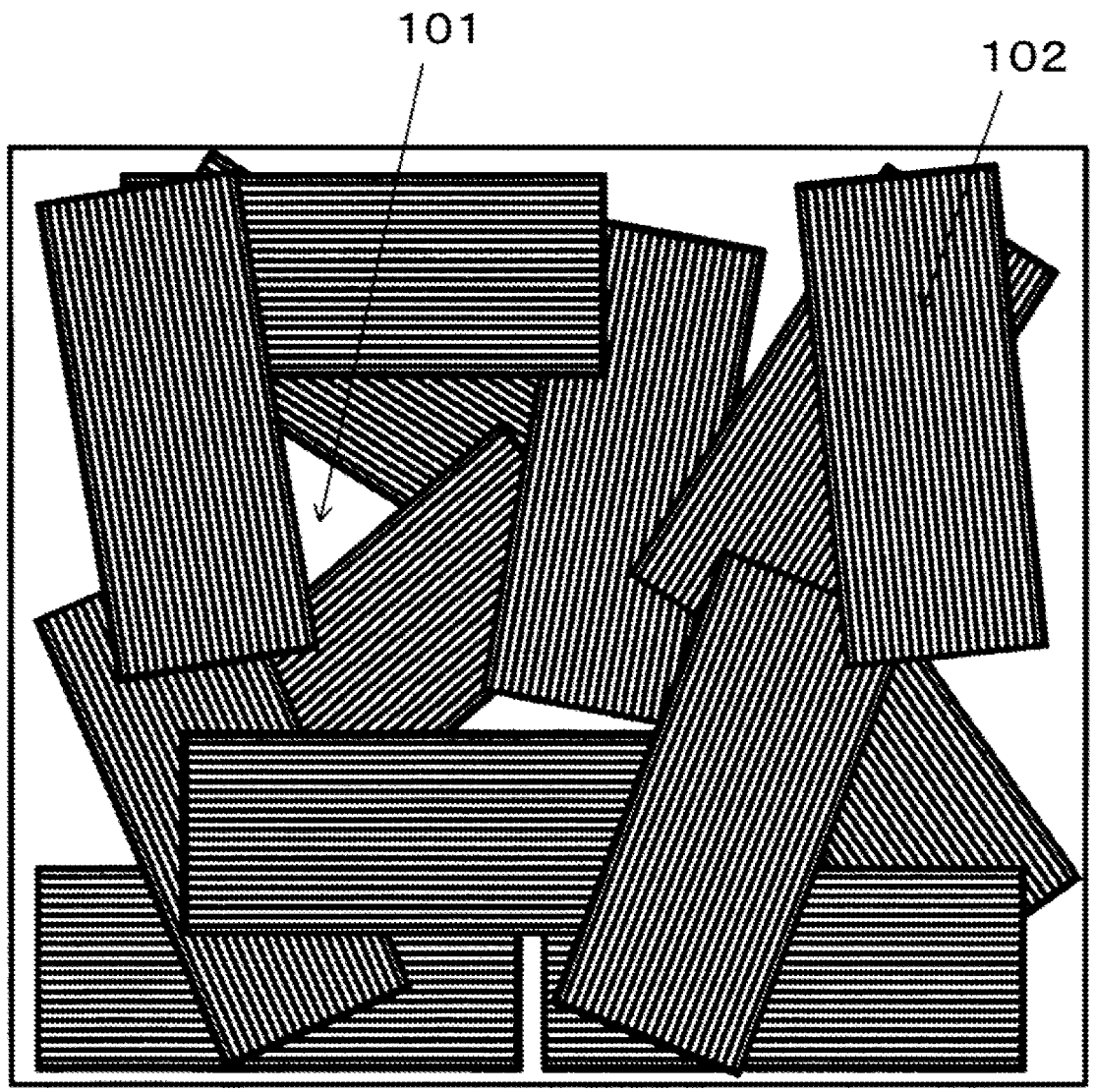
FIG. 1 is a schematic view of a composite material using thick fiber bundles.

[Carbon Fiber]
A polyacrylonitrile (PAN)-based carbon fiber, a petroleum/coal pitch-based carbon fiber, a rayon-based carbon fiber, a cellulose-based carbon fiber, a lignin-based carbon fiber, a phenol-based carbon fiber, and the like are known as a carbon fiber used in the present invention, and any of these carbon fibers can be suitably used in the present invention. In particular, the polyacrylonitrile (PAN)-based carbon fiber is preferably used in view of excellent tensile strength in the present invention.

A sizing agent may adhere to a surface of the carbon fiber used in the present invention. When the carbon fiber to which the sizing agent adheres is used, a type of the sizing agent can be appropriately selected depending on types of the carbon fiber and a matrix resin, and is not particularly limited.

[Fiber Diameter of Carbon Fiber]
A fiber diameter of a single fiber (in general, single fiber may be called as a filament) of the carbon fiber used in the present invention may be appropriately determined depending on the type of the carbon fiber, but is not particularly limited. In general, an average fiber diameter is preferably in a range of 3 μm to 50 μm, more preferably in a range of 4 μm to 12 μm, and still more preferably in a range of 5 μm to 8 μm. When the carbon fiber has a fiber bundle shape, the average fiber diameter does not refer to a diameter of the fiber bundle, but refers to the diameter of the carbon fiber (single fiber) constituting the fiber bundle. The average fiber diameter of the carbon fibers can be measured, for example, by a method described in JIS R-7607: 2000.

[Carbon Fiber A]
The composite material in the present invention is a composite material containing: a carbon fibers A including carbon fiber bundles A1 in which $Li/(Ni \times Di^2)$ satisfies $6.7 \times 10^1$ or more and $3.3 \times 10^3$ or less; and a thermoplastic matrix resin, in which the carbon fibers A have fiber lengths of 5 mm or more and 100 mm or less, $Lw_{A1}/(N_{A1}ave \times D_{A1}^2)$ is $1.0 \times 10^2$ or more and $3.3 \times 10^3$ or less, the carbon fiber bundles A1 have an average bundle width $W_{A1}$ of less than 3.5 mm, and the carbon fiber bundles A1 are 90 vol % or more with respect to the carbon fibers A.

Li: fiber length (mm) of carbon fiber bundle
Di: single fiber diameter (mm) of carbon fibers constituting carbon fiber bundle
Ni: fiber number (number) of single fibers contained in carbon fiber bundle
$Lw_{A1}$: weight average fiber length (mm) of carbon fiber bundles A1
$N_{A1}ave$: average fiber number (number) of single fibers contained in carbon fiber bundle A1
$D_{A1}$: single fiber diameter (mm) of carbon fibers constituting carbon fiber bundle A1

[Fiber Length of Carbon Fiber A]
The carbon fibers A of the present invention have fiber lengths of 5 mm or more and 100 mm or less. That is, all carbon fibers in this range are carbon fibers A, and on the contrary, carbon fibers having fiber lengths of less than 5 mm and carbon fibers having fiber lengths of more than 100 mm are not carbon fibers A.

1. Weight Average Fiber Length of Carbon Fibers A
A weight average fiber length of the carbon fibers A used in the present invention is not particularly limited, but the weight average fiber length is preferably 5 mm or more and 100 mm or less. The weight average fiber length of the carbon fibers A is more preferably 5 mm or more and 80 mm or less, and still more preferably 5 mm or more and 60 mm or less. When the weight average fiber length of the carbon fibers A is 100 mm or less, fluidity of a carbon fiber reinforced resin composite material is improved, and it is easy to obtain a desired shape of the molded body by press molding or the like. On the other hand, when the weight average fiber length is 5 mm or more, mechanical strength of the carbon fiber reinforced resin composite material is easy to be improved.

In the present invention, carbon fibers A having different fiber lengths from each other may be used in combination. In other words, the carbon fibers used in the present invention may have a single peak or a plurality of peaks in the weight average fiber length.

The average fiber length of the carbon fibers A can be determined based on the following formula (1), for example, by measuring fiber lengths of 100 fibers randomly extracted from the carbon fiber reinforced resin composite material to a unit of 1 mm by using a caliper or the like. The average fiber length is measured by a weight average fiber length (Lw).

When a fiber length of each carbon fiber is Li and a measured number is j, a number average fiber length (Ln) and the weight average fiber length (Lw) are determined by the following formulas (1) and (2).

$$Ln = \Sigma Li/j \qquad \text{Formula (1)}$$

$$Lw = (\Sigma Li^2)/(\Sigma Li) \qquad \text{Formula (2)}$$

When the fiber length is a fixed length, the number average fiber length and the weight average fiber length are the same value.

Extraction of the carbon fiber from the carbon fiber reinforced resin composite material can be performed, for example, by applying a heating treatment of about 500° C.×1 hour to the carbon fiber reinforced resin composite material and removing the resin in a furnace.

[Proportion of Carbon Fiber A]

A proportion of the carbon fiber A to the entire carbon fiber in the present invention is not particularly limited, but is preferably 50 vol % or more and 100 vol % or less, more preferably 70 vol % or more and 100 vol % or less, and even more preferably 80 vol % or more and 100 vol % or less.

[Aspect Ratio of Carbon Fiber Bundle A1]

In the present invention, carbon fiber bundles in which $Li/(Ni \times Di^2)$ is $6.7 \times 10^1$ or more and $3.3 \times 10^3$ or less are defined as the carbon fiber bundles A1. $Li/(Ni \times Di^2)$ represents an aspect ratio of the carbon fiber bundles. Although a normal aspect ratio indicates a length with respect to a diameter, an aspect ratio of the present invention considers (both the thickness and the width of) the cross-sectional area of the fiber bundle by squaring the fiber diameter. The larger the value of $Li/(Ni \times Di^2)$ is, the thinner the carbon fiber bundle is. Li is the fiber length of each carbon fiber bundle, and Ni is the number of fibers (number) of single fibers contained in each carbon fiber bundle. In a case where the fiber length of the carbon fiber bundle A1 is a fixed length, the aspect ratio of the carbon fiber bundle A1 is minimum when the number of fibers contained in the carbon fiber bundle A1 is maximum.

$Lw_{A1}/(N_{A1}ave \times D_{A1}^2)$ of the carbon fiber bundle A in the present invention is $1.0 \times 10^2$ or more and $3.3 \times 10^3$ or less. When the value of $Lw_{A1}/(N_{A1}ave \times D_{A1}^2)$ of the carbon fiber bundle A1 is larger than $3.3 \times 10^3$, the carbon fiber bundle is easy to be bent, and inherent strength of the carbon fiber cannot be exhibited in the composite material and the molded body using the composite material.

When compared with a composite material in which a fiber length, a fiber diameter, and a carbon fiber volume fraction (Vf) are constant, in a case where the value of $Lw_{A1}/(N_{A1}ave \times D_{A1}^2)$ is larger than $3.3 \times 10^3$, the number of flow units is too large, and the aspect ratio of the flow unit is excessively high, so that the carbon fiber is easy to be bent. When press molding of a composite material containing a lot of bent carbon fibers is tried, steric hindrance between the carbon fibers is large, spring back becomes large, and a freedom degree of molding is impaired.

When the bent carbon fibers generated due to flow molding are contained in the molded body, the mechanical properties of the carbon fibers are hard to be exhibited sufficiently.

Figure 2:
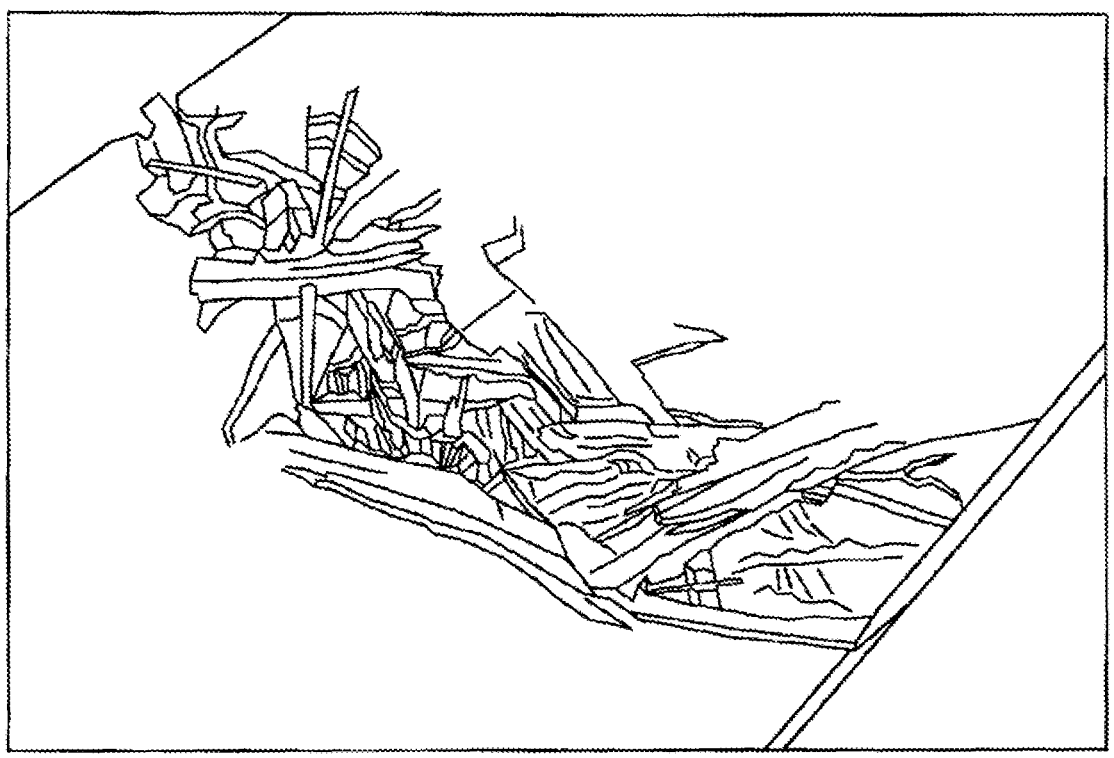
FIG. 2 is a schematic view when a molded body produced by using the composite material drawn in FIG. 1 is fractured by tensile force.
Figure 3:
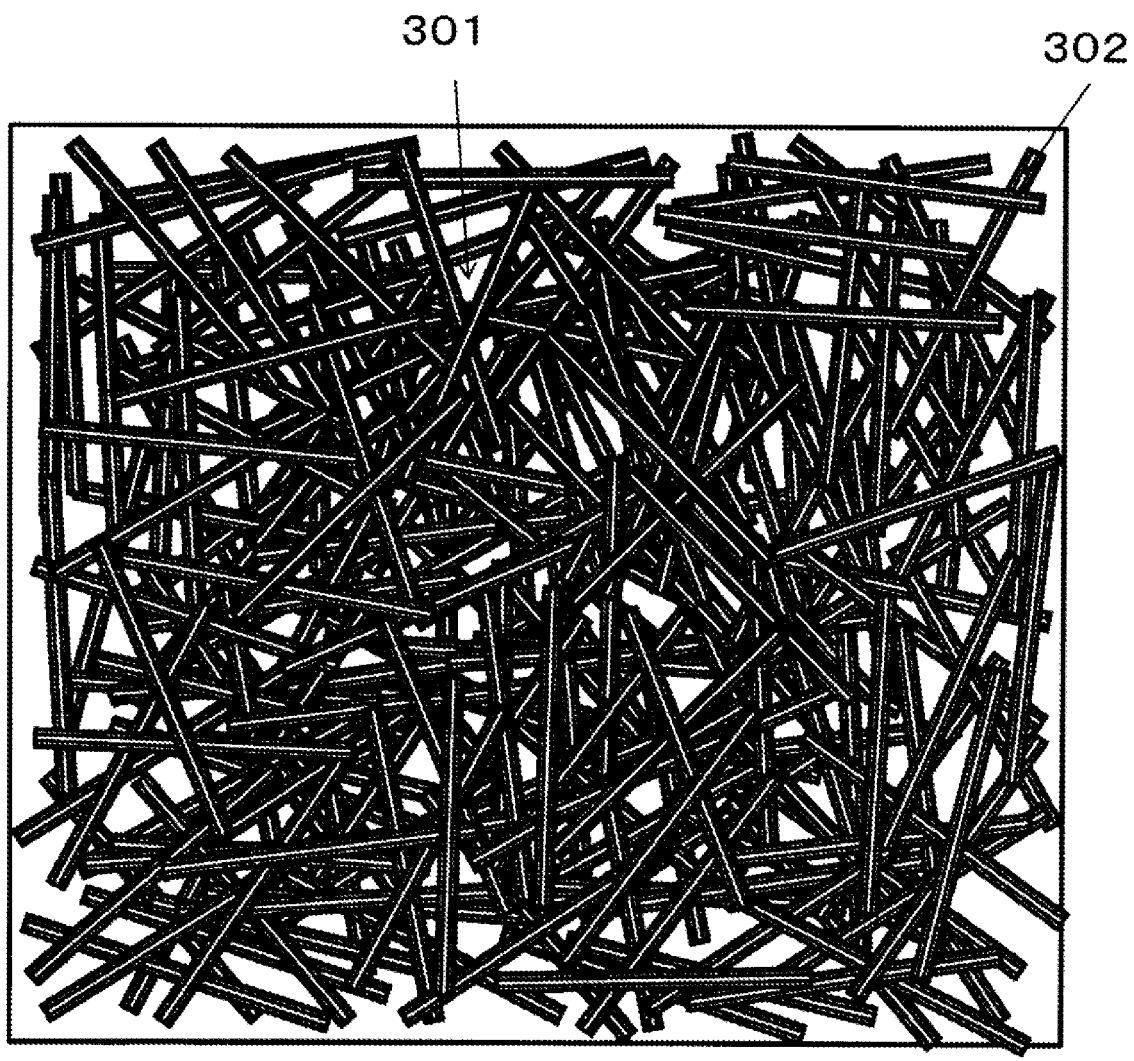
FIG. 3 is a schematic view of a composite material using a thin fiber bundle.
Figure 4:
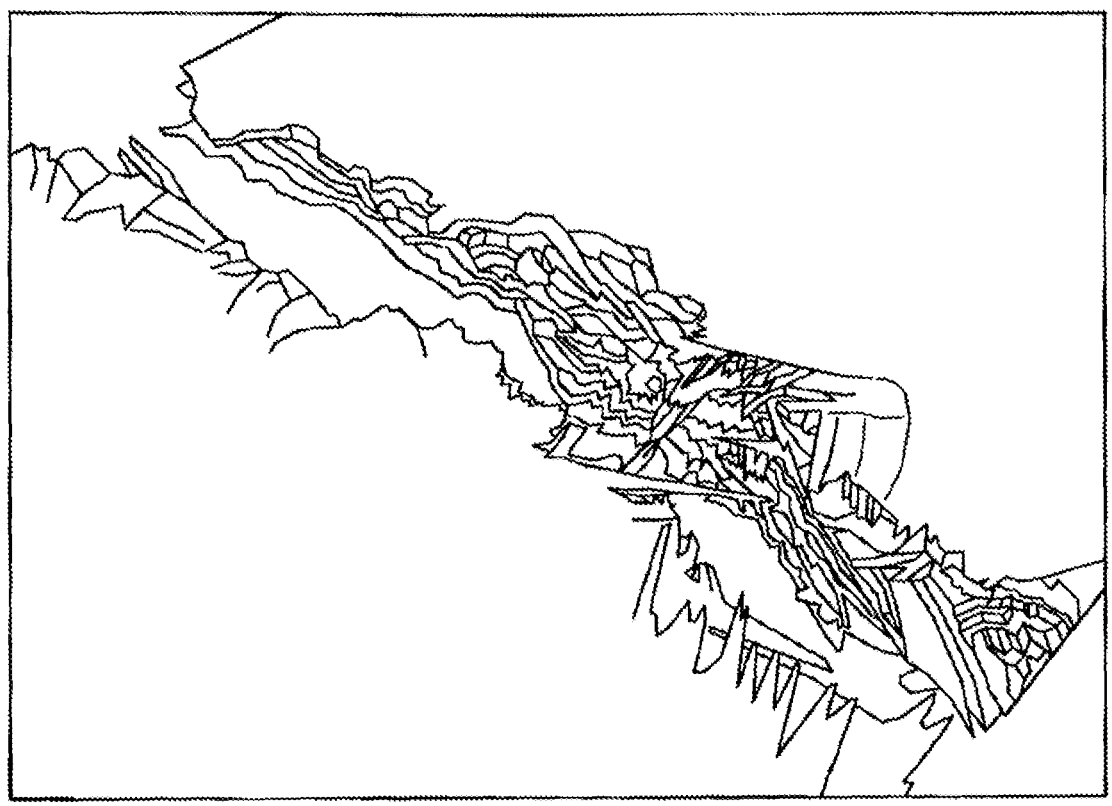
FIG. 4 is a schematic view when a molded body produced by using the composite material drawn in FIG. 3 is fractured by tensile force.

On the contrary, when the value of $Lw_{A1}/(N_{A1}ave \times D_{A1}^2)$ is too small, a sea of the thermoplastic matrix resin in the composite material called a resin pocket widens as indicated by 101 in FIG. 1. Therefore, in a tensile test, destruction occurs from the resin, and breakage occurs in an area of the thermoplastic matrix resin as shown in FIG. 2. When $Lw_{A1}/(N_{A1}ave \times D_{12})$ is in the range of $1.0 \times 10^2$ or more and $3.3 \times 10^3$ or less, the resin pocket 301 is relatively small as shown in FIG. 3. Therefore, in the tensile test, destruction from the resin is hard to occur, and as shown in FIG. 4, the carbon fiber is broken instead of the resin (a reinforcing effect of the carbon fiber itself is expressed) to obtain a composite material having high mechanical strength. Therefore, a broken surface cracks in a direction relatively perpendicular to the tensile direction.

An upper limit of $Lw_{A1}/(N_{A1}ave \times D_{A1}^2)$ is desirably $2.0 \times 10^3$ or less, preferably $1.4 \times 10^3$ or less, more preferably $1.1 \times 10^3$ or less, and still more preferably $9.1 \times 10^2$.

A lower limit of $Lw_{A1}/(N_{A1}ave \times D_{A1}^2)$ is desirably $1.3 \times 10^2$ or more, preferably $1.8 \times 10^2$ or more, more preferably $2.0 \times 10^2$ or more, and still more preferably $2.5 \times 10^2$ or more.

[Carbon Fiber A2]

The carbon fibers A in the present invention may contain more than 0 vol % and less than 10 vol % of a carbon fiber A2 in which $Li/(Ni \times Di^2)$ is more than $3.3 \times 10^3$. Since $Li/(Ni \times Di^2)$ is more than $3.3 \times 10^3$, the carbon fiber A2 have a too large aspect ratio, and the carbon fiber A2 is easy to be bent. However, when the resin pocket (for example, 301 in FIG. 3) cannot be filled completely even with the carbon fiber bundles A1 in the present invention, merit of filling the resin pocket is somewhat larger than demerit due to bending of the carbon fiber A2 if the resin pocket can be filled with a small number of carbon fibers A2.

A weight average fiber length, a single fiber diameter, and an average fiber number of the carbon fibers A2 can be defined as follows. When the carbon fiber A2 is completely monofilament, $N_{A2}ave$ is one.

$Lw_{A2}$: weight average fiber length (mm) of carbon fibers A2

$D_{A2}$: single fiber diameter (mm) of carbon fiber constituting carbon fiber A2

$N_{A2}ave$: average number (number) of fibers contained in carbon fiber A2

[Proportion of Carbon Fiber Bundle A1]

In the present invention, the carbon fiber bundle A1 is 90 vol % or more, preferably 95 vol % or more with respect to the carbon fiber A. In other words, the carbon fiber A other than the carbon fiber bundle A1 in the present invention is less than 10 vol %, preferably less than 5 vol %. A carbon fiber A in which a value of $Li/(Ni \times Di^2)$ is less than $6.7 \times 10^1$ or more than $3.3 \times 10^3$ (fiber length is 5 mm or more and 100 mm or less) is the carbon fiber A which is not the carbon fiber bundle A1 in the present invention. The carbon fiber bundle A1 may be 100 vol % with respect to the carbon fiber A.

When the proportion of the carbon fiber bundle A1 decreases, for example, when a proportion of the carbon fiber A2 is more than 10%, the bent carbon fibers increase, and the physical properties of the carbon fiber cannot be exhibited to the maximum. Further, there arises a problem that the spring back is large and the carbon fiber volume fraction (Vf) is hard to be raised.

Although the carbon fiber A other than the carbon fiber bundle A1 is preferably the carbon fiber A2, a carbon fiber A3 in which $Li/(Ni \times Di^2)$ is less than $6.7 \times 10^1$ (carbon fiber having a small aspect ratio and a large fiber bundle width) may be mixed as long as the object of the present invention is not impaired. There are few problems even the carbon fibers A3 may be mixed at 5 vol % or less, more preferably 3 vol % or less, even more preferably 1 vol % or less with respect to the carbon fiber A. When a proportion of the carbon fiber A3 is small as described above, when the thermoplastic matrix resin is used, non-impregnated parts are reduced, and deterioration of a surface appearance (deterioration of surface appearance due to exposure of non-impregnated fiber) is reduced.

In particular, as described in Patent Literature 1, when there is a bonded bundle aggregate that does not divide all the carbon fiber bundles, the resin pockets increase around the aggregate and become a starting point of destruction of the composite material, and the appearance is extremely deteriorated when the non-impregnated parts rise up to the surface. When a thermosetting matrix is used, impregnation is easy, but when a thermoplastic matrix resin is used, the problem becomes significant.

[Average Bundle Width $W_{A1}$ of Carbon Fiber Bundles A1]

In the present invention, the carbon fiber bundles A1 have an average bundle width $W_{A1}$ of less than 3.5 mm. The average width $W_{A1}$ of the carbon fiber bundles A is desirably 3.0 mm or less, preferably 2.0 mm or less, and more preferably 1.5 mm or less. When the average bundle width $W_{A1}$ is 3.5 mm or more, not only the strength of the fiber bundle cannot be sufficiently exhibited since the aspect ratio of the fiber bundle is too small, but also destruction occurs from the resin since a sea of the resin called a resin pocket is too wide (FIGS. 1 and 2).

On the other hand, a lower limit of the average bundle width $W_{A1}$ is preferably 0.3 mm or more. If the average bundle width $W_{A1}$ is 0.3 mm or more, the carbon fiber bundle A is hard to be bent, and production control becomes easy. A coefficient of variation of $W_{A1}$ in the present invention is desirably 100% or less, preferably 80% or less, and more preferably 50% or less.

[Average Thickness $T_{A1}$ of Carbon Fiber Bundles A1]

In the present invention, an average thickness $T_{A1}$ of the carbon fiber bundles A1 is desirably less than 95 μm, preferably less than 90 μm, more preferably less than 85 μm, still more preferably less than 75 μm, particularly preferably less than 70 μm, and most preferably less than 65 μm.

When a thickness of the carbon fiber bundle is small, in a case where a thermoplastic resin is used as a matrix, not only the carbon fiber bundle is easy to be impregnated, the number of carbon fiber bundles contained in the composite material also increases as compared with that having the same carbon fiber volume fraction (Vf). Therefore, the resin pockets (101 in FIG. 1, 301 in FIG. 3) can be reduced.

A coefficient of variation of the average thickness $T_{A1}$ of the carbon fiber bundles A1 is preferably 5% or more. If the coefficient of variation of the average thickness $T_{A1}$ of the carbon fiber bundles A1 is 5% or more, it is easy to fill the carbon fiber bundles A1 more densely in the thickness direction of the composite material, and the carbon fiber volume fraction (Vf) is easy to be elevated.

The coefficient of variation of the average thickness $T_{A1}$ of the carbon fiber bundles A1 is more preferably 7% or more, further more preferably 9% or more, and particularly preferably 10% or more. The coefficient of variation of the average thickness $T_{A1}$ of the carbon fiber bundles A1 is preferably 100% or less.

[$BL_{20}/L_{20}$ ratio of carbon fiber bundle A1]

In the composite material of the present invention, it is preferable that the carbon fiber bundles A satisfy that a ratio $BL_{20}/L_{20}$ of an average fiber bundle length $BL_{20}$ to an average fiber length $L_{20}$ of the 20 aggregates is preferably less than 1.3, the 20 aggregates being selected from aggregates of the carbon fiber bundles A1 obtained from the composite material subjected to an ashing treatment.

Figure 6:
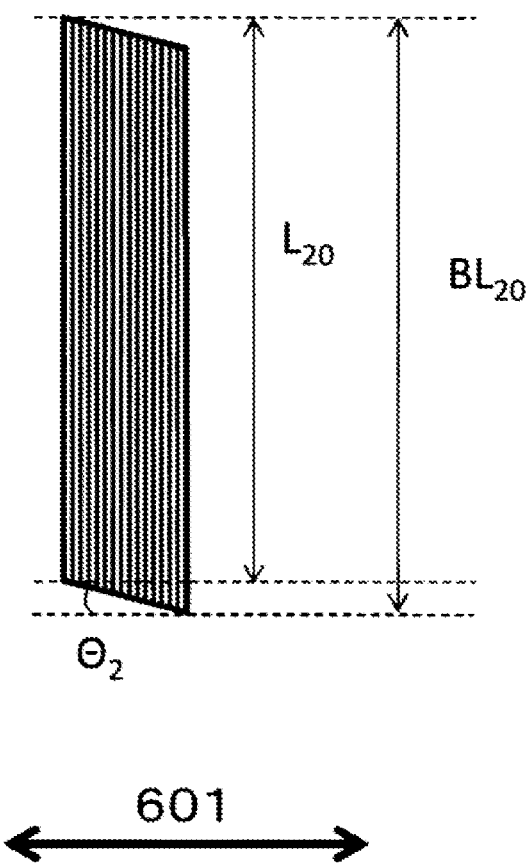
FIG. 6 is a schematic view showing an average fiber bundle length $BL_{20}$ and an average fiber length $L_{20}$.

A fiber bundle length $BL_{20}$ and a fiber length $L_{20}$ of the carbon fiber bundle A1 are expressed as shown in FIG. 6. The ratio $BL_{20}/L_{20}$ of the fiber bundle length $BL_{20}$ to the fiber length $L_{20}$ of less than 1.3 restricts that the single fibers constituting the fiber bundle spread in the fiber bundle direction in the fiber bundle. As a specific preferable example, as shown in FIG. 6, the carbon fiber bundle A1 is formed by cutting in an oblique direction in a range of a cutting angle $\theta_2$ with respect to the carbon fiber bundle width direction (601 in FIG. 6) to form an end of the carbon fiber bundle A1. The fiber bundle length $BL_{20}$ and the fiber length $L_{20}$ of the carbon fiber bundle A1 may be measured when a maximum projection area of the carbon fiber bundle A1 is observed.

Figure 7:
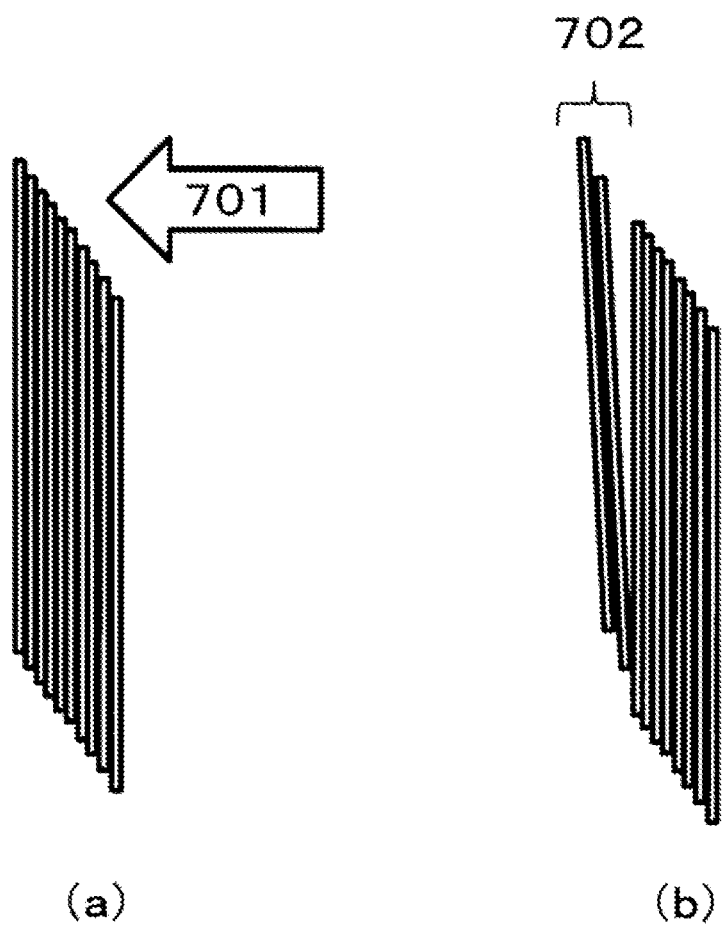
FIG. 7 is a schematic view showing that obliquely cut ends of carbon fiber bundles are easy to open when a composite material containing the carbon fiber bundles is press molded along with flowing.

In the related art, when the fiber bundle end of the carbon fiber bundle is formed by oblique cutting, occurrence of stress concentration at a longitudinal direction end of the carbon fiber bundle is further reduced, and there is a document in which higher mechanical characteristics of the molded body can be expressed and variations thereof can be further reduced (for example, WO 2017/159264). However, when the composite material is press molded along with flowing and the molded body is produced, a complex force shown in 701 in (a) of FIG. 7 is applied from other carbon fibers or the like, the carbon fiber end is easy to be opened ((b) of FIG. 7), and the carbon fiber bundle is separated or divided depending on the case in the production process. Therefore, in the present invention, when a carbon fiber bundle whose fiber bundle end is extremely obliquely cut is rather not used, a problem that the carbon fiber bundle is separated or divided (702 in FIG. 7) in a process of molding the composite material is hard to arise, and further the carbon fiber bundle is hard to be bent.

Further, when the carbon fiber bundle A1 in the present invention is used, the width of the carbon fiber bundle A1 is relatively small, so that there is little difference between the lengths of $BL_{20}$ and $L_{20}$, and "occurrence of stress concentration at the longitudinal direction end of the carbon fiber bundle" and "variation in the mechanical characteristics of the molded body" described in the related literatures are not ever problems. Therefore, the present inventors have considered that there arise more problems that the related knowledge cannot be all utilized; on the contrary, rather the carbon fiber bundle is easy to be divided and the carbon fiber bundle is bent.

Therefore, since the present inventors reverse the idea from the related concept, and make the ratio $BL_{20}/L_{20}$ of the average fiber bundle length $BL_{20}$ to the average fiber length $L_2$ of the aggregates of the carbon fiber bundles A1 less than 1.3, the carbon fiber A1 is prevented from being divided into single fibers and the bent carbon fibers are reduced when the composite material of the carbon fiber bundle A1 is produced or molded. The $BL_{20}/L_{20}$ in the present invention is more preferably less than 1.2, and further more preferably less than 1.1. In the present invention, $BL_{20}/L_{20}$ is particularly preferably 1.0.

[Carbon Fiber B]

The composite material of the present invention may contain a carbon fiber B having a fiber length of less than 5 mm, and the carbon fiber B preferably satisfies $N_B\text{ave} < N_{A1}\text{ave}$.

$N_B$ave: average number (number) of fibers configuring carbon fiber B

In the present invention, carbon fibers having a fiber length of less than 5 mm are all carbon fibers B, and carbon fibers having a fiber length of 5 mm or more are not carbon fibers B. The carbon fiber B may be a carbon fiber bundle or a single fiber (monofilament).

[Weight Average Fiber Length of Carbon Fibers B]

A weight average fiber length $Lw_B$ of the carbon fibers B is not particularly limited, but a lower limit thereof is preferably 0.05 mm or more, more preferably 0.1 mm or more, and still more preferably 0.2 mm or more. When the weight average fiber length $Lw_B$ of the carbon fibers B is 0.05 mm or more, the mechanical strength is easy to be ensured.

An upper limit of the weight average fiber length $Lw_B$ of the carbon fibers B is preferably less than a thickness of the molded body after molding the composite material, more specifically, more preferably less than 5 mm, still more preferably less than 3 mm, and further more preferably less than 2 mm. The weight average fiber length $Lw_B$ of the carbon fibers B is determined by the formulas (1) and (2) as described above.

When the resin pocket (for example, 301 in FIG. 3) cannot be filled completely even with the carbon fiber bundle A1 of the present invention, it is preferable that the resin pocket can be filled with a small number of carbon fibers B. Further, since the carbon fiber B has a fiber length of less than 5 mm, it is preferable that bending of the carbon fiber is hard to occur, and a flow unit including a part having a diameter of curvature of 2 mm or less is easy to be controlled to 30% or less of the whole.

[Flow Unit]

The flow unit is one aggregate of carbon fibers or single carbon fibers alone. For example, as shown in 102 in FIG. 1, in a case where carbon fibers are present in (wide) fiber bundles, each of fiber bundles thereof is a flow unit, and as shown in 302 in FIG. 3, in a case of the carbon fiber bundles A1 dispersed in a thin bundle, each of the thin carbon fiber bundles A1 becomes a flow unit. Naturally, each of the single fibers of the carbon fiber dispersed in a single fiber becomes a flow unit.

Figure 5:
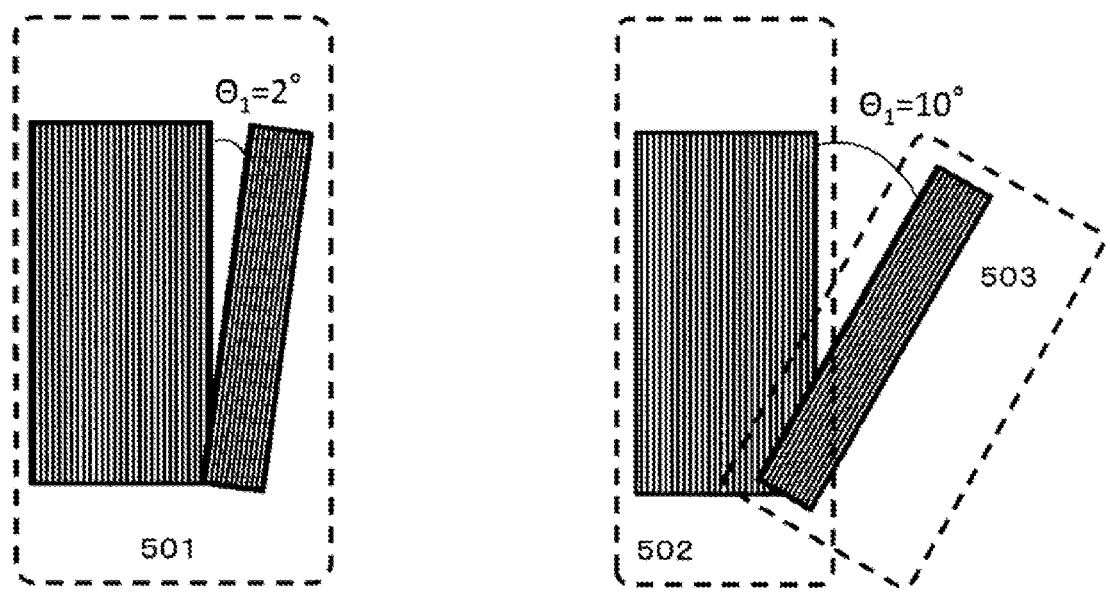
FIG. 5 is an explanatory view of a criterion to determine a flow unit.

Here, a determination criterion for regarding carbon fiber bundles as one flow unit is described by using FIG. 5. A case where a degree of an angle $\theta_1$ formed between one fiber bundle including a certain carbon fiber bundle and a single fiber or another fiber bundle adjacent to the one fiber bundle is 5° or less and they substantially adjoin to each other is regarded as one fiber bundle, that is, regarded as one flow unit, and cases other than the above case are treated as separate flow units.

When there are too many fiber bundles having a small fiber bundle width (when there are many carbon fiber bundles in which $Li/(Ni \times Di^2)$ is more than $3.3 \times 10^3$), stiffness of the fiber bundle is low, and straightness of the carbon fiber is easy to be lost. For example, since the glass fiber bundle described in Patent Literature 1 has a large cross-sectional area of the glass fiber bundle, in a case where the number of fibers constituting the bundle and the fiber length are the same, an aspect ratio of the glass fiber bundle is smaller than that of the carbon fiber bundle, so that the glass fiber bundle is easy to keep straightness.

[Flow Unit Including Part Having Diameter of Curvature of 2 mm or Less]

The diameter of curvature is an amount representing a condition of curvature of a curve or a curved surface. A local condition of curvature of a curve can be approximated to a circle, and a diameter of the approximate circle is referred to as the diameter of curvature. As the condition of curvature of the curve increases, the curvature becomes larger, and the diameter of curvature becomes smaller.

In the composite material of the present invention, the flow unit including a part having a diameter of curvature of 2 mm or less is preferably 30% or less of the whole, and in this range, a proportion of bent carbon fibers is small, so that the carbon fibers are easy to exhibit inherent strength and elasticity. The flow unit including a part having a diameter of curvature of 2 mm or less is more preferably 25% or less of the whole, further more preferably 20% or less of the whole, still more preferably 10% or less, even more preferably 7% or less, particularly preferably 5% or less, and most preferably 3% or less. With respect to the flow unit, only the carbon fiber A is observed (carbon fiber B is not observed), but a specific observation method will be described later.

[Thermoplastic Matrix Resin]

The thermoplastic matrix resin used in the present invention is not particularly limited, and those having a desired softening point or melting point can be appropriately selected and used. Those having a softening point in a range of 180° C. to 350° C. are generally used as the thermoplastic matrix resin, but the present invention is not limited thereto.

[Measurement of Fiber Bundle]

With respect to the carbon fiber bundle, as described later, recognition of the "fiber bundle" is a fiber bundle that can be taken out with tweezers. Regardless of a position pinched by the tweezers, the fiber bundle in which carbon fibers are clung together as a bundle of fibers are taken out as a bundle as a whole when taken out, thus the fiber bundles can be clearly defined. When the aggregate of the carbon fibers is observed to pick a fiber sample for analysis, by viewing the fiber sample from not only a direction of a longitudinal side thereof as well as various directions and angles, where the plurality of fibers are bundled and how the fibers are deposited can be confirmed in the aggregate of carbon fibers, and which fiber bundles function as a bundle can be objectively and unmistakably determined. For example, when the fibers overlap each other, it can be determined that the fibers are two fiber bundles if the element fibers are oriented to different directions with each other and are not entangled with each other at an intersecting part.

With respect to the width and thickness of each carbon fiber bundle A1, when three straight lines (x axis, y axis, and z axis) orthogonal to each other are considered, a longitudinal direction of each carbon fiber bundle A1 is set to an x axis direction, the longer one among a maximum value $y_{max}$ of a length in a y axis direction orthogonal thereto and a maximum value $z_{max}$ of a length in a z axis direction is taken as the width, and the shorter one is taken as the thickness. When $y_{max}$ and $z_{max}$ are equal, $y_{max}$ can be taken as the width, and $z_{max}$ can be taken as the thickness.

An average value of the width of each carbon fiber bundle A1 determined by the above method is taken as an average bundle width $W_{A1}$ of the carbon fiber bundles A1, and an average value of the thickness of each carbon fiber bundle A1 determined by the above method is taken as an average thickness $T_{A1}$ of the carbon fiber bundles A1.

[Method for Producing Composite Material]

A method for producing the composite material of the present invention is not particularly limited. In the present invention, continuous fibers are cut, carbon fibers having a fiber length of 5 mm or more and 100 mm or less are the carbon fibers A, but if the continuous fibers are converged in advance with a resin or the like as a method described in the following (1) or (2) before cutting, generation of the carbon fiber A2 having a large aspect ratio is easy to be reduced in a production process of the composite material, which is desirable.

(1) A fixed carbon fiber bundle where a fixing agent is attached to the carbon fiber bundle is opened and cut, and then impregnated with a thermoplastic matrix resin to produce the composite material.

(2) The opened carbon fiber bundle is impregnated with the thermoplastic matrix resin in advance and then cut to obtain the composite material.

In the present invention, opening means that the width of the carbon fiber bundle is increased (the thickness of the carbon fiber bundle is reduced).

As the production method of (2), a plurality of carbon fiber strands are arranged in parallel, the strand is made to have a target thickness by using a publicly known opening apparatus (such as opening using an air flow, opening that allows a plurality of bars made of metal or ceramic to pass through the strand, or opening using ultrasonic waves), and the carbon fibers are aligned and integrated with a target amount of thermoplastic matrix resin (hereinafter, UD prepreg). Thereafter, the UD prepreg is slit/cut to a desired width/length to produce a chopped strand or prepreg. The obtained chopped strand or prepreg is preferably deposited or laminated uniformly such that the fiber orientation is random. The laminated chopped strand or prepreg is heated and pressurized to melt the thermoplastic matrix resin present in the chopped strand or prepreg, and is integrated with other chopped strands or prepregs to obtain the composite material of the present invention. A method of attaching the thermoplastic resin is not particularly limited. There are a method of impregnating a strand of reinforced fibers with a thermoplastic resin directly melted, a method of impregnating a strand of a reinforced fibers by melting a film-like thermoplastic resin, and a method of impregnating a strand of reinforced fibers by melting a powder-like thermoplastic resin, and the like. A method of cutting the carbon fiber impregnated with the thermoplastic resin is not particularly limited, but a cutter such as a pelletizer, a guillotine means, or a Kodak means can be used. As a method of randomly and uniformly depositing or laminating the chopped strands or prepregs, for example, in a case of continuous production, a method of naturally dropping the prepreg obtained by cutting the carbon fiber from a high position and directly depositing the prepreg on a belt conveyor such as a steel belt, a method of blowing air into a falling path or installing a baffle plate, and the like are considered. In a case of batch production, a method in which the cut prepreg is accumulated in a container, a conveying device is installed on a lower surface of the container, and the prepreg is dispersed into a mold or the like for producing a sheet is exemplified.

The following effects 1 and 2 are obtained with any of the method for producing the composite material of the above (1) and the method for producing the composite material of the above (2).

1. Improvement of Molding Transferability

In a case of a general cold press, the composite material has better transferability to an upper surface (808 in FIG. 8) than a lower surface (807 in FIG. 8) of a mold. The heated composite material is disposed in a lower mold (807 in FIG. 8) having a temperature lower than that of the composite material before press, a lower surface layer region of the composite material is rapidly cooled and solidified immediately after being disposed, and the thermoplastic resin is hard to flow to the lower surface layer region of the composite material even though the mold closes and pressurization starts. As a result, mold transferability to the lower surface of the mold is generally lower than that of the upper surface.

On the other hand, when any of the composite material produced by the production method of the above (1) and the composite material produced by the production method of the above (2) is used, surroundings of the carbon fiber bundle are in a state of being rich in the thermoplastic resin. Therefore, when there are few parts of the surface of the composite material where the carbon fibers are exposed, a temperature of the lower surface layer region of the composite material is maintained, and the mold closes and pressurization starts, the thermoplastic resin can flow to the lower surface layer region of the composite material, and it is estimated that molding transferability of the front and back of the composite material at the time of cold press molding is the same. As a result, since molding can be performed without worrying about the molding upper surface and the molding lower surface, a processing range of molding increases.

2. Reduction of Recut Times of Mold

Generally, in a case of producing a mold for cold press molding, a shape of the mold is determined by performing simulation first, but a dimensional deviation is often present between the simulation and a molded body actually produced. A cause of the deviation is that distribution of the carbon fibers in the thickness direction of the composite material is uneven, and unintended warpage occurs in the molded body and does not coincide with target dimensions. Therefore, the mold produced based on simulation results is usually recut a plurality of times to conform to dimensions and shape of the target molded body.

On the other hand, when any of the composite material produced by the production method of the above (1) and the composite material produced by the production method of the above (2) is used, a divergence between the simulation and the actual molded body can be reduced, and recut times of the mold can be reduced. This is because even when any of the composite material produced by the production method of the above (1) and the composite material produced by the production method of the above (2) has a large inside flow at the time of molding and is folded and preformed, the plate thickness of the molded body is easy to be made uniform. The inside flow will be described later.

According to the method for producing the composite material of the above (2), further the following effects (3) to (5) is obtained.

3. When the opened carbon fiber bundle is impregnated with the thermoplastic matrix resin in advance and then cut to obtain the composite material, an effect of reducing a blister from shine fibers or fluff is obtained. A shine fiber refers to a phenomenon in which whiteness looks strong due to occurrence of a place where the carbon fiber bundle is locally concentrated when compared with a place where a dispersion state of the single fiber and the fiber bundle is good.

4. Since the carbon fiber bundle is hardened by a resin and generation of cotton fly in the production process is reduced, there is little contamination of work environment.

5. Since the matrix resin adheres to the carbon fiber, distribution dispersion of the carbon fiber and the matrix resin can be reduced when the composite material is obtained.

[Volume Fraction of Carbon Fiber Contained in Composite Material]

In the present invention, there is no particular limit to a carbon fiber volume fraction contained in the composite material (hereinafter, sometimes referred to as "Vf" in the present description), which is defined by the following formula (3), but the carbon fiber volume fraction (Vf) is preferably 10 vol % to 60 vol %, more preferably 20 vol % to 50 vol %, and still more preferably 25 vol % to 45 vol %.

Carbon fiber volume fraction $(Vf)$=100×carbon fiber volume/(carbon fiber volume+thermoplastic matrix resin volume)     Formula (3)

When the carbon fiber volume fraction (Vf) in the composite material is 10 vol % or more, desired mechanical properties are easily obtained. On the other hand, when the carbon fiber volume fraction (Vf) in the composite material is not more than 60 vol %, fluidity when the composite material is used for press molding or the like is good, and a desired molded body shape is easily obtained.

The carbon fiber volume fraction (Vf) is measured regardless of the type of the carbon fiber such as carbon fibers A and B.

[Spring Back Amount of Composite Material]

In order for press molding (preferably cold press molding) using the composite material, the composite material needs to be softened or melted by preheating or heating to a predetermined temperature, and when the thermoplastic matrix resin is softened and plasticized at the time of preheating, the composite material expands due to the spring back of the carbon fiber and the bulk density changes. When the bulk density changes at the time of preheating, air flows into the composite material, and thermal decomposition of the thermoplastic matrix resin is promoted while the composite material is porous and the surface area increases. Here, the spring back amount is a value obtained by dividing the thickness of the composite material at the time of preheating by the thickness before preheating.

When the composite material of the present invention is heated and the thermoplastic matrix resin is softened, the spring back amount is desirably more than 1.0 and less than 14.0 in the case of press molding. This is because if the spring back amount is less than 14.0, the composite material is hard to protrude from the mold when the mold is charged with the composite material.

The spring back amount is preferably more than 1.0 and equal to or less than 7.0, more preferably more than 1.0 and equal to or less than 3.0, still more preferably more than 1.0 and equal to or less than 2.5, and even more preferably more than 1.0 and equal to or less than 2.0.

The composite material of the present invention preferably has a tensile elongation ratio of 5% or more and 40% or less when heated to a moldable temperature. The tensile elongation ratio when the composite material of the present invention is heated to a moldable temperature is more preferably 30% or less, and further more preferably 20% or less. The tensile elongation ratio when the composite material of the present invention is heated to a moldable temperature is more preferably 2% or more, further more preferably 3% or less, particularly preferably 4% or more, and even more preferably 6% or more.

The tensile elongation ratio will be described later.

[Molded Body]

The composite material of the present invention is preferably a composite material for producing the molded body by press molding. As the press molding, cold press molding is preferable.

As described above, even in a case where the carbon fiber contained in the composite material is not bent, when a value of $Lw_{A1}/(N_{A1}ave \times D_{A1}^2)$ is more than $3.3 \times 10^3$, the carbon fiber bundle A1 is easy to be bent when molding that accompanies flow is performed. When the bent carbon fibers generated due to flow molding are contained in the molded body, the mechanical properties of the carbon fibers are hard to be exhibited sufficiently.

That is, the molded body preferable in the present invention is as follows.

A molded body containing: a carbon fiber $A_p$ including carbon fiber bundles $A1_p$ in which $Li/(Ni \times Di^2)$ satisfies $6.7 \times 10^1$ or more and $3.3 \times 10^3$ or less; and a thermoplastic matrix resin, in which a fiber length of the carbon fiber $A_p$ is 5 mm or more and 100 mm or less, $Lw_{A1p}/(N_{A1}ave_p \times D_{A1p}^2)$ is $1.0 \times 10^2$ or more and $3.3 \times 10^3$ or less, and the carbon fiber bundles Alp have an average bundle width $W_{A1p}$ of less than 3.5 mm, and the carbon fiber bundles Alp are 90 vol % or more with respect to the carbon fiber $A_p$.

Li: fiber length (mm) of carbon fiber bundle

Di: single fiber diameter (mm) of carbon fibers constituting carbon fiber bundle Ni: fiber number (number) of single fibers contained in carbon fiber bundle $Lw_{A1p}$: weight average fiber length (mm) of carbon fiber bundles Alp $N_{A1}ave_p$: average fiber number (number) of single fibers contained in carbon fiber bundle Alp $D_{A1p}$: single fiber diameter (mm) of carbon fibers constituting carbon fiber bundle Alp

[Press Molding]

As a preferable molding method at the time of producing the molded body by using the composite material, press molding (sometimes called compression molding), and a molding method such as hot press molding or cold press molding can be used.

In the present invention, press molding using a cold press method is particularly preferable. In a cold press method, for example, the composite material heated to a first predetermined temperature is thrown into a mold set to a second predetermined temperature, and then pressurization and cooling are performed.

Specifically, when the thermoplastic matrix resin constituting the composite material is crystalline, the first predetermined temperature is equal to or higher than a melting point, and the second predetermined temperature is lower than the melting point. When the thermoplastic matrix resin is amorphous, the first predetermined temperature is equal to or higher than a glass transition temperature, and the second predetermined temperature is lower than the glass transition temperature. That is, the cold press method includes at least the following step A-1) to step A-2).

Step A-1): A step of heating the composite material to the melting point or higher and a decomposition temperature or lower when the thermoplastic matrix resin is crystalline or to the glass transition temperature or higher and the decomposition temperature or lower when the thermoplastic matrix resin is amorphous.

Step A-2): A step of disposing the composite material heated in the above step A-1) in a mold in which a temperature is adjusted to less than a melting point when the thermoplastic matrix resin is crystalline or to less than a glass transition temperature when the thermoplastic matrix resin is amorphous, and pressing.

By performing these steps, molding of the composite material can be completed.

The above steps need to be performed in the above order, but may include other steps between the steps. Other steps include, for example, a forming step before the step A-2) of preforming the composite material into a cavity shape of the mold by using a forming mold different from the mold used in the step A-2). The step A-2) is a step of obtaining the molded body having a desired shape by applying pressure to the composite material. A molding pressure at this time is not particularly limited, and is preferably less than 20 MPa, and more preferably 10 MPa or less with respect to a projection area of the mold cavity.

As a matter of course, various steps may be put between the above steps at the time of press molding, for example, vacuum compression molding in which press molding is performed under vacuum may be used.

As described above, in a case where the composite material is molded along with flow, the carbon fiber bundles A1 defined in the present invention are hard to be bent, and the carbon fiber bundles A1 contained in the obtained molded body ensures linearity, so that the mechanical properties inherent in the carbon fiber is easy to be exhibited.

[Tensile Elongation Ratio when Composite Material is Heated and Softened]

In the method for producing a molded body of the present invention, a tensile elongation ratio when the composite material is heated to a temperature capable of cold pressing is preferably 5% or more and 40% or less.

A temperature at which the composite material can be cold pressed is a temperature at which the above cold press molding can be performed, in other words, the temperature is equal to or higher than a softening temperature of the thermoplastic resin contained in the composite material. For example, in a case of nylon 6, the temperature may be the melting point or higher or 300° C. or lower.

Figure 10:
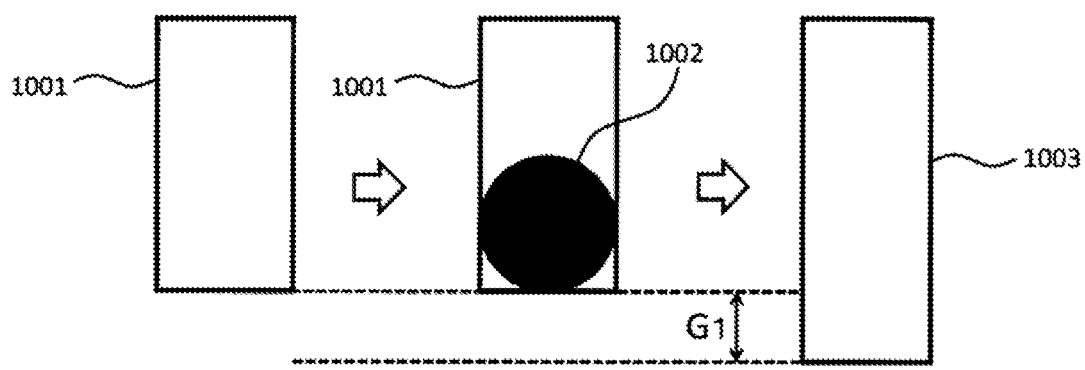
FIG. 10 is a schematic view showing a method for measuring a tensile elongation ratio of the composite material.

In measurement of the tensile elongation ratio, a composite material having a plate thickness of 2.0 mm is cut into 100 mm×200 mm and heated to a formable temperature, then in half of the composite material (area of 100 mm×100 mm), as drawn in FIG. 10, a weight adjusted such that an overall weight is 100 g is attached, the composite material where the weight is attached is suspended with the weight vertically downward in an environment of 25° C., and the extent of elongation is measured and determined by the following formula after 60 minutes have elapsed.

Tensile elongation ratio (%)=(length after elongation−length before elongation)÷length before elongation×100

In FIG. 10, an elongated length G1 corresponds to "the length after elongation—the length before elongation". Although not shown in FIG. 10, the composite material is suspended using a publicly known device such as a needle, a hook, or a clip. The weight can also be attached to the composite material by a publicly known mounting member such as a clip. In this case, a total weight of the attachment member and the weight is adjusted to be 100 g.

1. Preferable Upper Limit of Tensile Elongation Ratio

Figure 8:
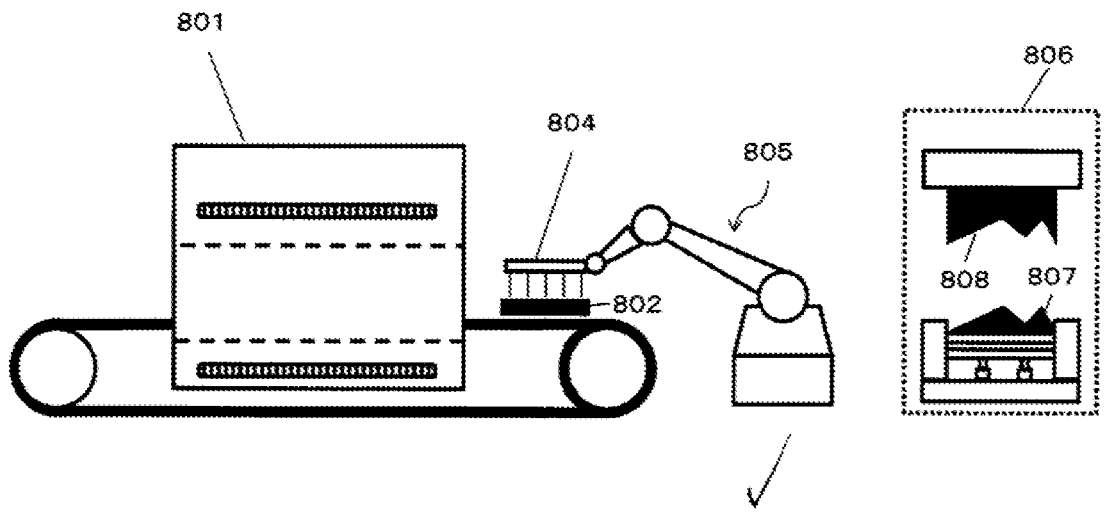
FIG. 8 is a schematic view for explaining press molding.

The composite material is preferably held by an automatic transfer apparatus and transferred to a mold (for example, a lower mold as shown in 807 in FIG. 8).

There is no particular limit to a method of holding the composite material by a holder of the automatic transfer apparatus (for example, 804 in FIG. 8), for example, a plurality of needle-like objects may be inserted into the composite material to hold the composite material, or the composite material may be held by using an automatic transfer apparatus having a mechanism that grips or scoops the composite material. Holding with 804 in FIG. 8 shows an example of inserting a needle into a molding material.

In order to easily mold a molded body having a complicated shape by cold pressing, it is important to devise not to decrease the temperature of the heated composite material, so that the faster the transfer speed, the better. When the transfer speed increases, the heated composite material is easy to be separate or fall, and a failure rate is easy to decrease. The transfer speed is a speed of the transfer apparatus until the composite material is held and then placed on the mold.

If the tensile elongation ratio is 40% or less, the composite material is heated to a temperature capable of cold pressing, the composite material is hard to be separated or fall when the composite material is gripped and conveyed to the mold. In particular, when the automatic transfer apparatus as 805 in FIG. 8 is used, the effect is significant.

If the tensile elongation ratio is 40% or less, tackiness of the composite material can be improved, and drapeability can be stabilized. The tensile elongation ratio is preferably 30% or less, and more preferably 20% or less.

2. Preferable Lower Limit of Tensile Elongation Ratio

The tensile elongation ratio is preferably 2% or more, more preferably 3% or less, still more preferably 4% or more, and even more preferably 6% or more. When the tensile elongation ratio is 2% or more, at the time of press molding by closing a molding upper mold (for example, 808 in FIG. 8) and a molding lower mold (for example, 807 in FIG. 8), the composite material is easy to flow inside the mold.

Figure 9:
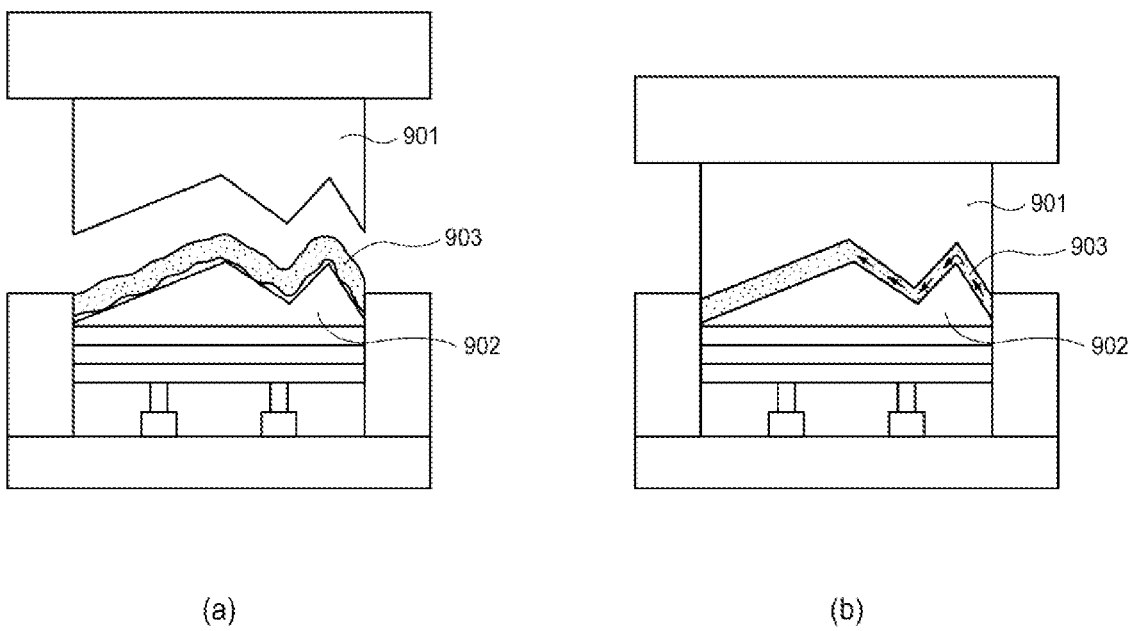
FIG. 9 is a schematic view for explaining inside flow.

The inside flow means that the composite material flows to an in-plane direction in the mold when the mold is closed after disposing the composite material at a charge rate of 100% with respect to the mold area, thereby making an uneven thickness of the obtained molded body even. A schematic view immediately after the composite material is disposed in the molding lower mold is indicated by 903 in (a) of FIG. 9, and the inside flow where the composite material flows in the in-plane direction in the mold is indicated by, for example, arrows in (b) of FIG. 9. The effect of making the uneven thickness of the molded body even by improving inside flowability (ease of inside flow) is more remarkable as the plate thickness is smaller. For example, even when the plate thickness of the molded body is 2 mm or less, the plate thickness is hard to be uneven, and even when the plate thickness is 1.5 mm or less, the plate thickness is hard to be uneven.

Although the inside flow is easy to be observed when the mold is a closed cavity, an effect of improving the inside flowability can be obtained even in an open cavity.

Since the composite material is easy to flow inside, the composite material is easy to follow the shape of the mold, so that the composite material can be molded even into a complicated design shape. By improving shape followability, the pressure inside the composite material is easy to be equalized, and a smaller press machine is used during press molding, thereby saving labor. Furthermore, since the molded body can be thinned and warpage of the molded body is reduced, an adhesive jig can be simplified.

EXAMPLES

Hereinafter, the present invention will be described in detail using Examples, but the present invention is not limited thereto.

1. Raw materials used in the following Production Examples and Examples are as follows. A decomposition temperature is a measurement result by thermogravimetric analysis.

PAN-Based Carbon Fiber

Carbon fiber "TENAX" (registered trademark) UTS50-24K (average fiber diameter: 7 μm, fiber width: 10 mm) manufactured by Teijin Limited Polyamide 6

Polyamide 6 may be abbreviated as PA 6 below.

Crystalline resin, melting point: 225° C., decomposition temperature (in air): 300° C.

2. Values in the Examples were Determined According to the Following Method.

(1) Analysis of Weight Average Fiber Length of Carbon Fibers Contained in Composite Material Measurement of the weight average fiber length of the carbon fibers contained in the composite material will be described below, and the weight average fiber length of the carbon fibers contained in the molded body can be measured by the same method.

For the weight average fiber length of the carbon fibers contained in the composite material, the thermoplastic matrix resin was removed in a furnace at 500° C. for about one hour.

(1-1) When Carbon Fiber B is not Contained

The thermoplastic matrix resin was removed, then lengths of 100 randomly extracted carbon fibers were measured and recorded to a unit of 1 mm with a caliper and a loupe, and the weight average fiber length (Lw) was determined by the following formula from the measured lengths of all the carbon fibers (Li, where i=an integer of 1 to 100).

$$Lw=(\Sigma Li^2)/(\Sigma Li) \quad \text{Formula (2)}$$

(1-2) When Carbon Fiber B is Contained

After the thermoplastic matrix resin was removed, the sample was bisected to two samples, 100 carbon fibers having a fiber length of 5 mm or more were randomly extracted from one of the bisected samples, and then lengths of 100 carbon fibers were measured in the same manner as in (1-1) described above.

A weight ($W_{total}$) of the bisected remaining sample was measured in advance. Thereafter, the sample was dispersed in water containing a surfactant while being unraveled and separated into carbon fibers of 5 mm or more and carbon fibers of less than 5 mm by using a mesh of 5 mm. The obtained carbon fibers of less than 5 mm were charged into water containing a surfactant and sufficiently stirred by ultrasonic vibration. The stirred dispersion liquid was randomly picked by a measuring spoon to obtain a sample for evaluation, and lengths of 3000 fibers were measured by an image analysis device LuzexAP manufactured by Nireco Corporation.

A number average fiber length Ln and a weight average fiber length Lw of the measured carbon fibers were determined by the above formulas (1) and (2), respectively. At this time, when fibers of 5 mm or more which have passed through the mesh unintentionally were mixed, the number average fiber length Ln and the weight average fiber length Lw of the carbon fibers B can be accurately calculated by excluding the fibers of 5 mm or more at the time of image analysis.

(2) Blending Proportion of Carbon Fiber B to Entire Carbon Fibers

The weight ($W_{total}$) of the bisected remaining sample obtained in the above (1-2) was measured in advance. Thereafter, the sample was dispersed in water containing a surfactant while being unraveled, and separated into a carbon fiber of 5 mm or more and a carbon fiber of less than 5 mm by using a mesh of 5 mm. A publicly known filtration device was used to extract the carbon fiber of less than 5 mm and measure a weight ($W_{<5mm}$) of the carbon fibers of less than 5 mm after drying. A proportion of the carbon fibers B in the composite material (or molded body) can be measured by $W_{<5mm}/W_{total}$.

When the carbon fiber of 5 mm or more has passed through the mesh unintentionally, by calculating a weight proportion Q of the carbon fiber component of 5 mm or more which is mixed unintentionally in the measurement of the above (1-2) by the following formula (4), the "blending proportion of the carbon fiber B to the entire carbon fibers" can be corrected.

$$Q=((\Sigma L_{i \geq 5mm}) \times D^2 \times \pi \times \rho cf \times 10^{-3})/W_{total} \quad (4)$$

$\Sigma L_{i \geq 5mm}$: Individual fiber length of carbon fiber of 5 mm or more unintentionally mixed in extract (mm)

D: Fiber diameter (mm) of used carbon fiber

π: Circle ratio

ρcf: Density (g/cm$^3$) of used carbon fiber $W_{total}$: Weight (g) measured in advance (3) Measurement Method of Bundle Six samples of 100 mm×100 mm were cut off from the composite material, and then the samples were heated for about one hour in an electric furnace heated to 500° C. to burn off organic substances such as a matrix resin. A mass of the remaining carbon fiber was measured after cooling to room temperature, then 200 carbon fibers A of 5 mm or more and 100 mm or less were taken out randomly with tweezers from the carbon fibers contained in each of the (six) samples, and a total of 1200 carbon fibers A were extracted from the six samples.

The reason why the total is set to be 1200 is that when an allowable error ε is 3%, a reliability μ (α) is 95%, and a population rate ρ is 0.5, a value n derived from the following formula (5) is 1068.

$$n=N/[(\varepsilon/\mu(\alpha))^2 \times \{(N-1)/\rho(1-\rho)\}+1] \quad \text{Formula (5)}$$

n: Necessary number of samples

μ(α): 1.96 when reliability is 95%

N: Size of population

ε: Allowable error

ρ: Population rate

The width and length of each carbon fiber bundle were measured by using a balance capable of measuring up to 1/100 mg for all extracted carbon fiber bundles. The number of bundles (I) and weight (Wi) of the carbon fiber bundle were measured.

Based on the fiber length of the carbon fiber bundle calculated from the length of the carbon fiber bundle and a fiber diameter D of the used carbon fiber, the carbon fiber A is divided into the carbon fiber bundle A1 and the carbon fiber A other than the carbon fiber bundle A1, and $\Sigma Wi_{A1}$ and $W_{other\ than\ A1}$ are measured respectively.

A volume fraction ($VF_{A1}$) of the carbon fiber bundle A1 to the total of carbon fibers A is determined by a formula (6) using the density (ρcf) of the carbon fiber.

$$VF_{A1}=\Sigma(Wi_{A1}/\rho cf) \times 100/((\Sigma Wi_{A1}+W_{other\ than\ A1})/\rho cf) \quad \text{Formula (6)}$$

When the carbon fiber B of less than 5 mm is contained and a bundle thereof is measured, the carbon fiber B is preferably measured in the same manner as the carbon fiber A.

(4) Average Thickness $T_{a1}$ and Average Width $W_{A1}$ of Carbon Fiber Bundles A1 and Method for Calculating CV Value With respect to each of 1200 carbon fiber bundles A1 extracted in the same manner as in (1-1), the thickness and width of the carbon fiber bundle A1 were measured using calipers, and the average thickness $T_{A1}$ of the fiber bundle thicknesses and the coefficient of variation thereof (CV value), and the average width $W_{A1}$ of the fiber bundle width and the coefficient of variation (CV value) thereof were calculated.

(5) Method for Calculating a Ratio $BL_{20}/L_{20}$ of Average Fiber Bundle Length $BL_{20}$ to Average Fiber Length L of Carbon Fiber Bundles A A sample of 100 mm×100 mm was cut off from the composite material, and was subjected to an ashing treatment by heating the sample in a furnace at 500° C. for one hour to remove the resin. Next, 20 carbon fiber bundles A1 were selected from the sample in which the resin was removed, and the average fiber bundle length $BL_{20}$ and the average fiber length $L_{20}$ of the selected carbon fiber bundles A1 were measured with calipers to calculate the value of $BL_{20}/L_{20}$.

(6) Diameter of Curvature

With respect to a diameter of curvature, any five places of the surface of the composite material were imaged at a magnification of 300 with a digital microscope VHX-1000 manufactured by Keyence Corporation, circles were drawn along all flow units in the fields of view by using a dimension measuring function of the same machine, and diameters of the circles were taken as the diameters of curvatures. The proportion (%) was calculated by dividing the number of flow units having a diameter of curvature of 2 mm or less by the measurement number. When there is a plurality of bending parts in one flow unit, a part having a minimum diameter of curvature was taken as the diameter of curvature of the flow unit.

(7) Spring Back Amount

The composite material was cut into 100 mm×100 mm, two sheets thereof were overlapped, and a thermocouple was inserted into a central portion of mating surfaces thereof. Then, the composite material and the thermocouple were charged into a preheating furnace in which an upper and lower heaters were heated to a temperature of 340° C., and heated until a temperature of the thermocouple is 275° C. When the thermocouple temperature reached 275° C., the composite material was removed from the furnace, cooled and solidified, and a thickness thereof after preheating was measured. A ratio of the thickness before preheating and the thickness after preheating is defined as a spring back amount and expressed by the following formula.

Spring back amount=thickness after preheating (mm)/thickness before preheating (mm)

(8) Tensile Characteristics

A test piece was cut off from the composite material by using a water jet, and a tensile test was performed by using a 5982R4407 universal tester manufactured by Instron with reference to JIS K 7164 (2005). A shape of the test piece was an A shape. A distance between the chucks was 115 mm, and a test speed was 2 mm/min.

(9) Tensile Elongation Ratio

A composite material having a plate thickness of 2.0 mm produced in each Example and Comparative Example was cut into 100 mm×200 mm and heated to 300° C., which is a formable temperature, then in half of the composite material (an area of 100 mm×100 mm), as drawn in FIG. 10, a weight adjusted such that an overall weight is 100 g was attached, the composite material where the weight was attached was suspended with the weight vertically downward in an environment of 25° C., and the extent of elongation was measured after 60 minutes have elapsed. The tensile elongation ratio was determined by the following formula.

Tensile elongation ratio (%)=(length after elongation−length before elongation)÷length before elongation×100

(10) Falling Out of Composite Material During Conveyance

A composite material having a plate thickness of 2.0 mm produced in each Example and Comparative Example was cut into 1300 mm×1300 mm, heated to 300° C., which is a formable temperature, and then the composite material (802 in FIG. 8) was gripped and disposed in a mold by using a conveyance arm including a plurality of needles as shown in 804 in FIG. 8. Intervals between the needles of the conveyance arm were adjusted to be 400 mm separately.

Excellent: The composite material could be conveyed to the mold, and could be cold press molded after being disposed in a desired preformed shape.

Good: Although the composite material could be conveyed to the mold, the composite material stretched during conveyance, and could not be disposed in a desired preformed shape.

Bad: Since the composite material fell out from the conveyance arm during conveyance, the composite material could not be conveyed to the mold.

Example 1

As the carbon fiber, a plurality of long fibers including a carbon fiber "Tenax" (registered trademark) UTS 50-24K (average fiber diameter: 7 μm, number of single fibers: 24,000, strand thickness of carbon fibers: 180 μm (caliper measurement)) manufactured by Teijin Limited passes through a heating bar of 200° C., to open the long fibers into strands having thickness of a caliper measurement value of 70 μm, the strands were wound on a paper tube, thereby strands opened from the carbon fibers were obtained. The obtained strands opened from carbon fibers were aligned by arranging a plurality of opened strands in one direction, a use amount of a nylon 6 (PA6) film (nylon 6 resin film, manufactured by Unitika Ltd., "EMBLEM ON-25", melting point: 220° C.) was adjusted such that the carbon fiber volume fraction (Vf) was 40%, and a hot press treatment was performed to obtain a unidirectional sheet material.

Thereafter, the obtained unidirectional sheet material was slit to a fiber bundle target width of 1 mm, and then a guillotine type cutting machine was used to cut the fiber length to a standard size length of 20 mm, a chopped strand or prepreg was produced, and dropped and deposited on a belt conveyor of a steel belt such that a fiber orientation is random and a predetermined areal weight was obtained, thereby a composite precursor was obtained. The carbon fiber contained in the chopped strand is designed to have a carbon fiber length of 20 mm, a carbon fiber bundle width of 1 mm, and a carbon fiber bundle thickness of 70 μm on design (target value). In addition, since the carbon fiber strand was cut in a direction perpendicular to the longitudinal direction at the time of cutting, it was designed that a ratio of the carbon fiber bundle length to the carbon fiber length was 1:1 ($\theta_2$ in FIG. 6 is 0 degree) (however, in a case of an embodiment of Example 1, the carbon fiber form slightly changes after the composite material precursor was pressed by a press device). A predetermined number of the obtained composite material precursors were laminated in a 350 mm square mold for a slab and heated at 2.0 MPa for 20 minutes in a press device heated to 260° C., thereby obtaining a composite material having an average thickness of 2.0 mm.

With respect to the obtained composite material, the diameter of curvature of the flow unit was measured by microscopic observation of the surface of the carbon fiber composite material, and when the carbon fiber contained in the composite material was analyzed, the carbon fiber volume fraction (Vf) was 40%. The weight average fiber length ($Lw_{A1}$) of the carbon fiber bundles A1 was 20 mm, the average fiber number ($N_{A1}$ave) of the single fibers contained in the carbon fiber bundle A1 was 1600, the single fiber diameter ($D_{A1}$) of the carbon fibers constituting the carbon fiber bundle A1 was 0.007 mm, $Lw_{A1}/(N_{A1}ave \times D_{A1}^2)$ was $2.6 \times 10^2$, a proportion of the carbon fiber A to the entire carbon fibers was 100 vol %, and the carbon fiber bundle A1 was 100 vol % with respect to the carbon fiber A. Since the fiber bundle was slightly extended at the time of pressing, the average bundle width $W_{A1}$ of the carbon fiber bundles A1 in the composite material was 1.2 mm, and the coefficient of variation of $W_{A1}$ was 14%. The average thickness of the carbon fiber bundles A1 was 60 μm, and the coefficient of variation of $T_{A1}$ was 16%. With respect to the obtained composite material, a percentage of the flow unit including a part having a diameter of curvature of 2 mm or less to all the flow units determined by the above method was 1.3%, and $BL_{20}/L_{20}$ was 1.0.

Further, tensile strength was 499 MPa, a tensile modulus was 32 GPa, and a spring back amount was 1.2 as determined by the above method. In addition, the tensile elongation ratio was 12%, and an evaluation result of falling out when the composite material was conveyed was "Excellent".

The reason why the average bundle width $W_{A1}$ of the carbon fiber bundles A1 was 1.2 mm in spite that the fiber bundle target width was slit to 1 mm was considered to be that the fiber bundles expanded and the average bundle width $W_{A1}$ increased since the fiber bundle was heated at 2.0 MPa for 20 minutes with a press device heated to 260° C. during production of the composite material.

Comparative Examples 1 to 3

Composite materials of Comparative Examples 1 to 3 were produced in the same manner as in Example 1 except that conditions were appropriately adjusted to obtain composite materials to be shown below. Specifically, the average number (number) of fibers contained in the carbon fiber bundle A1 was adjusted by changing the fiber bundle target width while "the unidirectional sheet material was slit to the fiber bundle width target width of 1 mm" in Example 1. As a result, fluctuation coefficients or the like of $W_{A1}$, $T_{A1}$, and $T_{A1}$ were adjusted.

With respect to the composite material of Comparative Example 1, the carbon fiber volume fraction (Vf) was 40%, the weight average fiber length ($Lw_{A1}$) of the carbon fiber bundles A1 was 20 mm, the average fiber number ($N_{A1}$ave) of the single fibers contained in the carbon fiber bundle A1 was 6100, the single fiber diameter ($D_{A1}$) of the carbon fibers constituting the carbon fiber bundle A1 was 0.007 mm, $Lw_{A1}/(N_{A1}ave \times D_{A1}^2)$ was $6.7 \times 10^1$, a proportion of the carbon fiber A to the entire carbon fibers was 100 vol %, the carbon fiber bundle A1 was 100 vol % with respect to the carbon fiber A, the average bundle width $W_{A1}$ of the carbon fiber bundles A1 was 2.3 mm, the coefficient of variation of $W_{A1}$ was 15%, the average thickness $T_{A1}$ of the carbon fiber bundles A1 was 135 μm, the coefficient of variation of $T_{A1}$ was 22%, a percentage of the flow unit including a part having a diameter of curvature of 2 mm or less to all the flow units was 0.8%, and $BL_{20}/L_{20}$ was 1.0. The composite material of Comparative Example 1 had tensile strength of 349 MPa, a tensile modulus of 29 GPa, and a spring back amount of 1.2 determined by the above method. In addition, a tensile elongation ratio was 6%, and an evaluation result of falling out when the composite material was conveyed was "Excellent".

With respect to the composite material of Comparative Example 2, the carbon fiber volume fraction (Vf) was 40%, the weight average fiber length ($Lw_{A1}$) of the carbon fiber bundles A1 was 20 mm, the average fiber number ($N_{A1}$ave) of the single fibers contained in the carbon fiber bundle A1 was 4500, the single fiber diameter ($D_{A1}$) of the carbon fibers constituting the carbon fiber bundle A1 was 0.007 mm, $Lw_{A1}/(N_{A1}ave \times D_{A1}^2)$ was $9.1 \times 10^1$, a proportion of the carbon fiber A to the entire carbon fibers was 100 vol %, the carbon fiber bundle A1 was 100 vol % with respect to the carbon fiber A, the average bundle width $W_{A1}$ of the carbon fiber bundles A1 was 2.2 mm, the coefficient of variation of $W_{A1}$ was 14%, the average thickness $T_{A1}$ of the carbon fiber bundles A1 was 100 μm, the coefficient of variation of $T_{A1}$ was 19%, a percentage of the flow unit including a part having a diameter of curvature of 2 mm or less to all the flow units was 1.1%, and $BL_{20}/L_{20}$ was 1.0. The composite material of Comparative Example 2 had tensile strength of 362 MPa, a tensile modulus of 30 GPa, and a spring back amount of 1.2 determined by the above method. In addition, a tensile elongation ratio was 7%, and an evaluation result of falling out when the composite material was conveyed was "Excellent".

With respect to the composite material of Comparative Example 3, the carbon fiber volume fraction (Vf) was 40%, the weight average fiber length ($Lw_{A1}$) of the carbon fiber bundles A1 was 30 mm, the average fiber number ($N_{A1}$ave) of the single fibers contained in the carbon fiber bundle A1 was 24000, the single fiber diameter ($D_{A1}$) of the carbon fibers constituting the carbon fiber bundle A1 was 0.007 mm, $Lw_{A1}/(N_{A1}ave \times D_{A1}^2)$ was $2.6 \times 10^1$, a proportion of the carbon fiber A to the entire carbon fibers was 100 vol %, the carbon fiber bundle A1 was 100 vol % with respect to the carbon fiber A, the average bundle width $W_{A1}$ of the carbon fiber bundles A1 was 5.0 mm, the coefficient of variation of $W_{A1}$ was 14%, the average thickness $T_{A1}$ of the carbon fiber bundles A1 was 60 μm, the coefficient of variation of $T_{A1}$ was 13%, a percentage of the flow unit including a part having a diameter of curvature of 2 mm or less to all the flow units was 0.5%, and $BL_{20}/L_{20}$ was 1.0. The composite material of Comparative Example 3 had tensile strength of 324 MPa, a tensile modulus of 25 GPa, and a spring back amount of 1.2 determined by the above method. In addition, the tensile elongation ratio was 5%, and the evaluation result of falling when the composite material was conveyed was "Excellent".

Comparative Example 4

As the carbon fiber, a carbon fiber "Tenax" (registered trademark) UTS 50-24K (average fiber diameter: 7 μm, number of single fibers: 24,000, strand thickness of carbon fibers: 180 μm (caliper measurement), fiber width: 10 mm) manufactured by Teijin Limited are opened to use a carbon fiber having a carbon fiber width of 20 mm. A rotary cutter with a spiral knife disposed on the surface by using a cemented carbide was used as the cutting device. A pitch of the blade was 20 mm, and the carbon fiber was cut to a fiber length of 20 mm. A nipple made of SUS304 having a different diameter was welded, and a double tube was produced as an opening device. A small hole was provided in the inner tube, and compressed air was fed between the inner tube and the outer tube by using a compressor. The tube was disposed directly under the rotary cutter, and a tapered tube was welded to a lower portion of the tube. The thermoplastic matrix resin was supplied from a side surface of the tapered tube, and particles obtained by cryogrinding a nylon 6 resin A1030 manufactured by Unitika Corporation were used as the matrix resin. Next, a table movable in an XY direction was disposed in a lower portion of the outlet the tapered tube, and suction was performed by a blower from a lower portion of the table. Then, a composite material precursor in which the carbon fiber of the composite material and the thermoplastic matrix resin were mixed was obtained. At this time, since the carbon fiber bundle was opened at once with air, 10% or more of carbon fibers in which $Li/(Ni \times Di^2)$ was more than $3.3 \times 10^3$ were produced.

The composite material precursor was adjusted such that the carbon fiber volume fraction of the composite material was 40%.

A predetermined number of the obtained composite material precursors were laminated in a 350 mm square mold for a slab such that the thickness of the composite material was 2.0 mm, and heated at 2 MPa for 20 minutes in a press device heated to 260° C., thereby obtaining the composite material having a thickness of 2.0 mm. When the obtained molded plate was subjected to an ultrasonic flaw detection test, an unimpregnated portion or a void was not confirmed. With respect to the composite material, when the diameter of curvature of the flow unit was measured by microscope observation of the surface of the carbon fiber composite material and the carbon fiber contained therein was analyzed, the weight average fiber length ($Lw_{A1}$) of the carbon fiber bundle A1 was 20 mm, the average fiber number ($N_{A1}$ave) of the single fibers contained in the carbon fiber bundle A1 was 670, the single fiber diameter ($D_{A1}$) of the carbon fibers constituting the carbon fiber bundle A1 was 0.007 mm, $Lw_{A1}/(N_{A1}ave \times D_{A1}^2)$ was $6.1 \times 10^2$, a proportion of the carbon fiber A to the entire carbon fibers was 100 vol %, the carbon fiber bundle A1 was 80 vol % with respect to the carbon fiber A, the average bundle width $W_{A1}$ of the carbon fiber bundles A1 in the composite material was 1 mm, the coefficient of variation of $W_{A1}$ was 28%, the average thickness $T_{A1}$ of the carbon fiber bundles A1 was 50 μm, the coefficient of variation of $T_{A1}$ was 38%, and a percentage of the flow unit including a part having a diameter of curvature of 2 mm or less to all the flow units determined by the above method was 7%. The weight average fiber length ($Lw_{A2}$) of the carbon fibers A2 was 20 mm, the single fiber diameter ($D_{A2}$) of the carbon fibers constituting the carbon fiber A2 was 0.007 mm, and an average number ($N_{A2}$ave) of fibers contained in the carbon fiber A2 was 50. The carbon fiber bundle A2 was 20 vol % with respect to the carbon fiber A.

The obtained composite material had tensile strength of 457 MPa, a tensile modulus of 31 GPa, and a spring back amount of 1.3 determined by the above method. In addition, the tensile elongation ratio was 1%, and the evaluation result of falling when the composite material was conveyed was "Excellent".

Example 2

(Step 1)

As the carbon fiber, a carbon fiber "Tenax" (registered trademark) UTS 50-24K (average fiber diameter: 7 μm, number of single fibers: 24,000, strand thickness of carbon fibers: 180 μm (caliper measurement), fiber width: 10 mm) manufactured by Teijin Limited was used, and the carbon fiber was opened and used as a width of 20 mm.

A rotary cutter was used as the cutting device, and an interval between blades was 12 mm. A tube having a small hole was prepared as an opening device, and compressed air was fed by using a compressor.

The tube was disposed directly under the rotary cutter, and a tapered tube was welded to a lower portion of the tube. The thermoplastic matrix resin was supplied from a powder supply device from the side of the tapered tube. Powders obtained by cryogenic grinding of nylon 6 resin A1030 manufactured by Unitika Corporation were used as the thermoplastic matrix resin.

Next, a support body that can move in a planar direction and has air permeability was installed below the outlet of the tapered tube, and a device was operated to obtain a product α. The product α was heated at 2.0 MPa for 20 minutes in a press device heated to 260° C. to obtain a product β (a carbon fiber volume fraction was 40%) having a thickness t of 2.0 mm. Here, the obtained product β was finely pulverized by using a large low-speed plastic pulverizer to obtain a particle material R.

The obtained particle material R and polyamide 6 were mixed such that the carbon fiber volume fraction (Vf) was 17%, and the mixture was poured into a TEM26S2 screw extruder manufactured by Toshiba Machine Co., Ltd. and melt-kneaded at a cylinder temperature of 280° C. and a screw rotation speed of 100 rpm to obtain a resin pellet of the carbon fiber. The resin pellet (the carbon fiber volume fraction (Vf) was 17%) was further pulverized by a pulverizer to obtain a resin powder P.

When a fiber length of the carbon fiber contained in the resin powder P was measured, the weight average fiber length was 0.2 mm.

(Step 2)

A unidirectional sheet material was obtained in the same manner as in Example 1 except that a use amount of a nylon 6 film was adjusted so that Vf was 50% in the same method as in Example 1. The unidirectional sheet material was slit to a target width of 1 mm in the same manner as in Example 1, and then cut into a standard size length of 20 mm by using a guillotine type cutting machine to obtain a chopped strand or prepreg.

(Step 3)

While a weight ratio of the carbon fiber A to the carbon fiber B was adjusted to 77:23 and the resin powder P having Vf of 17% was charged, the chopped strand or prepreg produced in the step 2 was deposited in a predetermined areal weight in a 350 mm square mold for a slab such that the carbon fiber orientation was random, and then heated at 2.0 MPa for 20 minutes in a press device heated to 260° C., and a composite material having a carbon fiber volume fraction (Vf) of 40% (carbon fiber volume fraction (Vf) of the sum of carbon fiber A and carbon fiber B) and an average thickness of 2.0 mm was obtained.

With respect to the composite material, when the diameter of curvature of the flow unit was measured by microscope observation of the surface of the carbon fiber composite material and the carbon fiber contained therein was analyzed, the weight average fiber length ($Lw_{A1}$) of the carbon fiber bundles A1 was 20 mm, the average fiber number ($N_{A1}$ave) of the single fibers contained in the carbon fiber bundle A1 was 1600, the single fiber diameter ($D_{A1}$) of the carbon fibers constituting the carbon fiber bundle A1 was 0.007 mm, $Lw_{A1}/(N_{A1}ave \times D_{A1}^2)$ was $2.6 \times 10^2$, the carbon fiber bundle A1 was 100 vol % with respect to the carbon fiber A, a proportion of the carbon fiber A to the entire carbon fibers was 77 vol %, the average bundle width $W_{A1}$ of the carbon fiber bundles A1 in the composite material was 1.3 mm, the coefficient of variation of $W_{A1}$ was 14%, the average thickness $T_{A1}$ of the carbon fiber bundles A1 was 60 μm, the coefficient of variation of $T_{A1}$ was 16%, a percentage of the flow unit including a part having a diameter of curvature of 2 mm or less to all the flow units determined by the above method was 1.3%, and $BL_{20}/L_{20}$ was 1.0. The weight average fiber length ($Lw_B$) of the carbon fibers B was 0.2 mm, the single fiber diameter ($D_B$) of the carbon fiber constituting the carbon fiber B was 0.007 mm, an average number of fibers contained in the carbon fiber B ($N_B$ave) was one, the maximum fiber length of the carbon fibers B was 0.87 mm, and a proportion of the carbon fiber B to the entire carbon fibers was 23 vol %.

The obtained composite material had tensile strength of 405 MPa, a tensile modulus of 28 GPa, and a spring back amount of 1.1 determined by the above method. In addition, the evaluation result of falling when the composite material was conveyed was "Excellent".

Comparative Example 5

(Step 1)
The resin powder P was obtained in the same manner as step 1 of Example 2.
(Step 2)
As the carbon fiber A, a carbon fiber "Tenax" (registered trademark) UTS 50-24K (average fiber diameter: 7 μm, number of single fibers: 24,000, strand thickness of carbon fibers: 180 μm (caliper measurement), fiber width: 10 mm) manufactured by Teijin Limited are opened to use a carbon fiber having a fiber width of 20 mm. A rotary cutter was used as a cutting device of the carbon fiber A. A pitch of the blade was 20 mm, and the carbon fiber was cut to a fiber length of 20 mm.

A nipple made of SUS304 having a different diameter was welded, and a tube having double structures was produced as an opening device. A small hole was provided in the inner tube, and compressed air was fed between the inner tube and the outer tube by using a compressor. The tube was disposed directly under the rotary cutter, and a tapered tube was welded to a lower portion of the tube. The resin powder P obtained in the step 1 was supplied by a powder supply device from the side of the tapered tube.

Next, a support body movable in a planar direction was installed below the outlet the tapered tube, and suction was performed by a blower from a back side of the support body. The device was operated, and adjusted such that the carbon fiber volume fraction of the sum of the carbon fiber A and the carbon fiber B in the composite material was 40% and the weight ratio of the carbon fiber A to the carbon fiber B was 77:23, and the carbon fiber A and the resin powder P were mixed to obtain a composite material precursor.

A predetermined number of the obtained composite material precursors were laminated in a 350 mm square mold for a slab such that the thickness of the composite material was 2.0 mm, and heated at 2 MPa for 20 minutes in a press device heated to 260° C., thereby obtaining a plate composite material having a plate thickness of 2.0 mm.

With respect to the composite material, when the diameter of curvature of the flow unit was measured by microscope observation of the surface of the carbon fiber composite material and the carbon fiber contained therein was analyzed, the weight average fiber length ($Lw_{A1}$) of the carbon fiber bundles A1 was 20 mm, the average fiber number ($N_{A1}$ave) of the single fibers contained in the carbon fiber bundle A1 was 670, the single fiber diameter ($D_{A1}$) of the carbon fibers constituting the carbon fiber bundle A1 was 0.007 mm, $Lw_{A1}/(N_{A1}ave \times D_{A1}^2)$ was $6.1 \times 10^2$, the carbon fiber bundle A1 was 80 vol % with respect to the carbon fiber A, a proportion of the carbon fiber A to the entire carbon fibers was 77 vol %, the average bundle width $W_{A1}$ of the carbon fiber bundles A1 in the composite material was 1.0 mm, the coefficient of variation of $W_{A1}$ was 27%, the average thickness $T_{A1}$ of the carbon fiber bundles A1 was 50 μm, the coefficient of variation of $T_{A1}$ was 35%, a percentage of the flow unit including a part having a diameter of curvature of 2 mm or less to all the flow units determined by the above method was 7%, and $BL_{20}/L_{20}$ was 1.0. The weight average fiber length ($Lw_{A2}$) of the carbon fibers A2 was 20 mm, the single fiber diameter ($D_{A2}$) of the carbon fibers constituting the carbon fiber A2 was 0.007 mm, and an average number ($N_{A2}$ave) of fibers contained in the carbon fiber A2 was 50. The carbon fiber bundle A2 was 20 vol % with respect to the carbon fiber A. The weight average fiber length ($Lw_B$) of the carbon fibers B was 0.2 mm, the single fiber diameter ($D_B$) of the carbon fiber constituting the carbon fiber B was 0.007 mm, an average number of fibers contained in the carbon fiber B ($N_B$ave) was one, the maximum fiber length of the carbon fibers B was 0.87 mm, and a proportion of the carbon fiber B to the entire carbon fibers was 23 vol %. The obtained composite material had tensile strength of 395 MPa, a tensile modulus of 27 GPa, and a spring back amount of 1.2 determined by the above method. In addition, the evaluation result of falling when the composite material was conveyed was "Excellent".

Example 3

A unidirectional sheet was produced in the same manner as in Example 1, except that Polyamide-MXD6 (Ren registered trademark) manufactured by Mitsubishi Engineering-Plastics Corporation was used, and a composite material was produced.

With respect to the obtained composite material, the diameter of curvature of the flow unit was measured by microscopic observation of the surface of the carbon fiber composite material, and when the carbon fiber contained in the composite material was analyzed, the carbon fiber volume fraction (Vf) was 40%. The weight average fiber length ($Lw_{A1}$) of the carbon fiber bundles A1 was 20 mm, the average fiber number ($N_{A1}$ave) of the single fibers contained in the carbon fiber bundle A1 was 1600, the single fiber diameter ($D_{A1}$) of the carbon fibers constituting the carbon fiber bundle A1 was 0.007 mm, $Lw_{A1}/(N_{A1}ave \times D_{A1}^2)$ was $2.6 \times 10^2$, a proportion of the carbon fiber A to the entire carbon fibers was 100 vol %, and the carbon fiber bundle A1 was 100 vol % with respect to the carbon fiber A. Since the fiber bundle was slightly extended at the time of pressing, the average bundle width $W_{A1}$ of the carbon fiber bundles A1 in the composite material was 1.2 mm, and the coefficient of variation of $W_{A1}$ was 14%. The average thickness $T_{A1}$ of the carbon fiber bundles A1 was 60 μm, and the coefficient of variation of $T_{A1}$ was 16%. With respect to the obtained composite material, a percentage of the flow unit including a part having a diameter of curvature of 2 mm or less to all the flow units determined by the above method was 1.3%, and $BL_{20}/L_{20}$ was 1.0.

Further, tensile strength was 403 MPa, a tensile modulus was 32 GPa, and a spring back amount was 1.2 as determined by the above method. In addition, the tensile elongation ratio was 58%, and the evaluation result of falling when the composite material was conveyed was "Bad".

Example 4

A composite material was obtained in the same manner as in Example 1 except that an average fiber number was adjusted by adjusting a slit having a fiber bundle target width a little smaller.

The carbon fiber volume fraction (Vf) of the composite material obtained in Example 4 was 40%. The weight average fiber length ($Lw_{A1}$) of the carbon fiber bundles A1 was 20 mm, the average fiber number ($N_{A1}$ave) of the single fibers contained in the carbon fiber bundle A1 was 1400, the single fiber diameter ($D_{A1}$) of the carbon fibers constituting the carbon fiber bundle A1 was 0.007 mm, $Lw_{A1}/(N_{A1}\text{ave} \times D_{A1}^2)$ was $2.9 \times 10^2$, a proportion of the carbon fiber A to the entire carbon fibers was 100 vol %, and the carbon fiber bundle A1 was 100 vol % with respect to the carbon fiber A. The average bundle width $W_{A1}$ of the carbon fiber bundles A1 in the composite material was 1.0 mm, and the coefficient of variation of $W_{A1}$ was 15%. The average thickness $T_{A1}$ of the carbon fiber bundles A1 was 60 μm, and the coefficient of variation of $T_{A1}$ was 16%. With respect to the obtained composite material, a percentage of the flow unit including a part having a diameter of curvature of 2 mm or less to all the flow units determined by the above method was 1.3%, and $BL_{20}/L_{20}$ was 1.0.

Further, tensile strength was 506 MPa, a tensile modulus was 32 GPa, and a spring back amount was 1.2 as determined by the above method. In addition, the tensile elongation ratio was 14%, and the evaluation result of falling when the composite material was conveyed was "Excellent".

Example 5

A composite material was obtained in the same manner as in Example 1 except that an average fiber number was adjusted by adjusting a slit having a fiber bundle target width a little smaller than that in Example 4.

The carbon fiber volume fraction (Vf) of the composite material obtained in Example 5 was 40%. The weight average fiber length ($Lw_{A1}$) of the carbon fiber bundles A1 was 20 mm, the average fiber number ($N_{A1}$ave) of the single fibers contained in the carbon fiber bundle A1 was 1100, the single fiber diameter ($D_{A1}$) of the carbon fibers constituting the carbon fiber bundle A1 was 0.007 mm, $Lw_{A1}/(N_{A1}\text{ave} \times D_{A1}^2)$ was $3.7 \times 10^2$, a proportion of the carbon fiber A to the entire carbon fibers was 100 vol %, and the carbon fiber bundle A1 was 100 vol % with respect to the carbon fiber A. The average bundle width $W_{A1}$ of the carbon fiber bundles A1 in the composite material was 0.8 mm, and the coefficient of variation of $W_{A1}$ was 15%. The average thickness $T_{A1}$ of the carbon fiber bundles A1 was 60 μm, and the coefficient of variation of $T_{A1}$ was 16%. With respect to the obtained composite material, a percentage of the flow unit including a part having a diameter of curvature of 2 mm or less to all the flow units determined by the above method was 1.2%, and $BL_{20}/L_{20}$ was 1.0.

Further, tensile strength was 509 MPa, a tensile modulus was 32 GPa, and a spring back amount was 1.2 as determined by the above method. In addition, the tensile elongation ratio was 17%, and the evaluation result of falling when the composite material was conveyed was "Excellent".

Example 6

A composite material was obtained in the same manner as in Example 1 except that the fiber length was cut to a standard size length of 30 mm.

The carbon fiber volume fraction (Vf) of the composite material obtained in Example 6 was 40%. The weight average fiber length ($Lw_{A1}$) of the carbon fiber bundles A1 was 30 mm, the average fiber number ($N_{A1}$ave) of the single fibers contained in the carbon fiber bundle A1 was 1600, the single fiber diameter ($D_{A1}$) of the carbon fibers constituting the carbon fiber bundle A1 was 0.007 mm, $Lw_{A1}/(N_{A1}\text{ave} \times D_{A1}^2)$ was $3.8 \times 10^2$, a proportion of the carbon fiber A to the entire carbon fibers was 100 vol %, and the carbon fiber bundle A1 was 100 vol % with respect to the carbon fiber A. The average bundle width $W_{A1}$ of the carbon fiber bundles A1 in the composite material was 1.2 mm, and the coefficient of variation of $W_{A1}$ was 14%. The average thickness $T_{A1}$ of the carbon fiber bundles A1 was 60 μm, and the coefficient of variation of $T_{A1}$ was 16%. With respect to the obtained composite material, a percentage of the flow unit including a part having a diameter of curvature of 2 mm or less to all the flow units determined by the above method was 1.4%, and $BL_{20}/L_{20}$ was 1.0.

Further, tensile strength was 486 MPa, a tensile modulus was 32 GPa, and a spring back amount was 1.1 as determined by the above method. In addition, the tensile elongation ratio was 15%, and the evaluation result of falling when the composite material was conveyed was "Excellent".

Example 7

A composite material was obtained in the same manner as in Example 1 except that the fiber length was cut to a standard size length of 50 mm.

The carbon fiber volume fraction (Vf) of the composite material obtained in Example 7 was 40%. The weight average fiber length ($Lw_{A1}$) of the carbon fiber bundle A1 was 50 mm, the average fiber number ($N_{A1}$ave) of the single fibers contained in the carbon fiber bundle A1 was 1600, the single fiber diameter ($D_{A1}$) of the carbon fibers constituting the carbon fiber bundle A1 was 0.007 mm, $Lw_{A1}/(N_{A1}\text{ave} \times D_{A1}^2)$ was $6.4 \times 10^2$, a proportion of the carbon fiber A to the entire carbon fibers was 100 vol %, and the carbon fiber bundle A1 was 100 vol % with respect to the carbon fiber A. The average bundle width $W_{A1}$ of the carbon fiber bundles A1 in the composite material was 1.2 mm, and the coefficient of variation of $W_{A1}$ was 15%. The average thickness $T_{A1}$ of the carbon fiber bundles A1 was 60 μm, and the coefficient of variation of $T_{A1}$ was 18%. With respect to the obtained composite material, a percentage of the flow unit including a part having a diameter of curvature of 2 mm or less to all the flow units determined by the above method was 1.6%, and $BL_{20}/L_{20}$ was 1.0.

Further, tensile strength was 503 MPa, a tensile modulus was 32 GPa, and a spring back amount was 1.1 as determined by the above method. In addition, the tensile elongation ratio was 19%, and the evaluation result of falling when the composite material was conveyed was "Excellent".

Example 8

A composite material was obtained in the same manner as in Example 1 except that a strand thickness of the carbon fiber was adjusted.

The carbon fiber volume fraction (Vf) of the composite material obtained in Example 8 was 40%. The weight average fiber length ($Lw_{A1}$) of the carbon fiber bundle A1 was 20 mm, the average fiber number ($N_{A1}$ave) of the single fibers contained in the carbon fiber bundle A1 was 1600, the single fiber diameter ($D_{A1}$) of the carbon fibers constituting the carbon fiber bundle A1 was 0.007 mm, $Lw_{A1}/(N_{A1}ave \times D_{A1}^2)$ was $2.6 \times 10^2$, a proportion of the carbon fiber A to the entire carbon fibers was 100 vol %, and the carbon fiber bundle A1 was 100 vol % with respect to the carbon fiber A. The average bundle width $W_{A1}$ of the carbon fiber bundles A1 in the composite material was 1.2 mm, and the coefficient of variation of $W_{A1}$ was 19%. The average thickness $T_{A1}$ of the carbon fiber bundles A1 was 45 μm, and the coefficient of variation of $T_{A1}$ was 20%. With respect to the obtained composite material, a percentage of the flow unit including a part having a diameter of curvature of 2 mm or less to all the flow units determined by the above method was 1.5%, and $BL_{20}/L_{20}$ was 1.0.

Further, tensile strength was 520 MPa, a tensile modulus was 32 GPa, and a spring back amount was 1.2 as determined by the above method. In addition, the tensile elongation ratio was 9%, and the evaluation result of falling when the composite material was conveyed was "Excellent".

Example 9

A composite material was produced in the same manner as in Example 1 except that the carbon fiber bundle A1 described in Example 1 was adjusted to 93 vol % with respect to the carbon fiber A and the carbon fiber A2 described in Comparative Example 4 was adjusted to 7 vol % with respect to the carbon fiber A.

The carbon fiber volume fraction (Vf) of the composite material obtained in Example 9 was 40%. The weight average fiber length ($Lw_{A1}$) of the carbon fiber bundle A1 was 20 mm, the average fiber number ($N_{A1}$ave) of the single fibers contained in the carbon fiber bundle A1 was 1600, the single fiber diameter ($D_{A1}$) of the carbon fibers constituting the carbon fiber bundle A1 was 0.007 mm, $Lw_{A1}/(N_{A1}ave \times D_{A1}^2)$ was $2.6 \times 10^2$, a proportion of the carbon fiber A to the entire carbon fibers was 100 vol %, and the carbon fiber bundle A1 was 93 vol % with respect to the carbon fiber A as described above. The average bundle width $W_{A1}$ of the carbon fiber bundles A1 in the composite material was 1.2 mm, and the coefficient of variation of $W_{A1}$ was 14%. The average thickness $T_{A1}$ of the carbon fiber bundles A1 was 60 μm, and the coefficient of variation of $T_{A1}$ was 16%. With respect to the obtained composite material, a percentage of the flow unit including a part having a diameter of curvature of 2 mm or less to all the flow units determined by the above method was 3%, and $BL_{20}/L_{20}$ was 1.0. The weight average fiber length ($Lw_{A2}$) of the carbon fibers A2 was 20 mm, the single fiber diameter ($D_{A2}$) of the carbon fibers constituting the carbon fiber A2 was 0.007 mm, and an average number ($N_{A2}$ave) of fibers contained in the carbon fiber A2 was 50. The carbon fiber bundle A2 was 7 vol % with respect to the carbon fiber A as described above.

Further, tensile strength was 483 MPa, a tensile modulus was 32 GPa, and a spring back amount was 1.2 as determined by the above method. In addition, the tensile elongation ratio was 8%, and the evaluation result of falling when the composite material was conveyed was "Excellent".

Example 10

A composite material was produced in the same manner as in Example 1 except that the carbon fiber bundle A1 described in Example 1 was adjusted to 97 vol % with respect to the carbon fiber A and the carbon fiber A2 described in Comparative Example 4 was adjusted to 3 vol % with respect to the carbon fiber A.

The carbon fiber volume fraction (Vf) of the composite material obtained in Example 10 was 40%. The weight average fiber length ($Lw_{A1}$) of the carbon fiber bundle A1 was 20 mm, the average fiber number ($N_{A1}$ave) of the single fibers contained in the carbon fiber bundle A1 was 1600, the single fiber diameter ($D_{A1}$) of the carbon fibers constituting the carbon fiber bundle A1 was 0.007 mm, $Lw_{A1}/(N_{A1}ave \times D_{A1}^2)$ was $2.6 \times 10^2$, a proportion of the carbon fiber A to the entire carbon fibers was 100 vol %, and the carbon fiber bundle A1 was 97 vol % with respect to the carbon fiber A as described above. The average bundle width $W_{A1}$ of the carbon fiber bundles A1 in the composite material was 1.2 mm, and the coefficient of variation of $W_{A1}$ was 14%. The average thickness $T_{A1}$ of the carbon fiber bundles A1 was 60 μm, and the coefficient of variation of $T_{A1}$ was 16%. With respect to the obtained composite material, a percentage of the flow unit including a part having a diameter of curvature of 2 mm or less to all the flow units determined by the above method was 5%, and $BL_{20}/L_{20}$ was 1.0. The weight average fiber length ($Lw_{A2}$) of the carbon fibers A2 was 20 mm, the single fiber diameter ($D_{A2}$) of the carbon fibers constituting the carbon fiber A2 was 0.007 mm, and an average number ($N_{A2}$ave) of fibers contained in the carbon fiber A2 was 50. The carbon fiber bundle A2 was 3 vol % with respect to the carbon fiber A as described above.

Further, tensile strength was 486 MPa, a tensile modulus was 31 GPa, and a spring back amount was 1.2 as determined by the above method. In addition, the tensile elongation ratio was 5%, and the evaluation result of falling when the composite material was conveyed was "Excellent".

INDUSTRIAL APPLICABILITY

The composite material of the present invention can be used at all sites where impact absorption is desired, such as various components, for example, components of an automobile, various electrical products, and machine frames or housings. Preferably, the composite material can be used as an automobile part.

Although the present invention has been described in detail using specific embodiments, it will be apparent to those skilled in the art that various modifications and variations are possible without departing from the spirit and scope of the present invention.

This application is based on Japanese Patent Application 2017-229666 filed on Sep. 29, 2017 and Japanese Patent Application 2018-149791 filed on Aug. 8, 2018, contents of which are incorporated by reference herein.

REFERENCE SIGN LIST

101 Resin pocket
102 Fiber bundle
301 Resin pocket
302 Fiber bundle
501, 502, 503 One flow unit
601 Carbon fiber bundle width direction
701 Force applied to carbon fiber end during molding
702 Carbon fiber bundle separated by applying force to carbon fiber end
801 Heating furnace
802 Composite material
804 Conveyance arm
805 Automatic transfer apparatus 806 Press molding apparatus
807 Mold (Lower mold)
808 Mold (Upper mold)
901 Mold (Upper mold)
902 Mold (Lower mold)
903 Composite material
1001 Composite material immediately before tensile elongation test is performed
1002 Weight
1003 Composite material after tensile elongation test was performed
$G_1$ Elongated length

What is claimed is:

1. A method for producing a composite material having a slab shape, the method comprising:
   opening carbon fibers into carbon fiber strands;
   aligning the carbon fiber strands by arranging the carbon fiber strands in one direction;
   performing a hot press treatment of the aligned carbon fiber strands with a thermoplastic matrix resin to obtain a unidirectional sheet material;
   slitting the unidirectional sheet material to obtain slit unidirectional sheet material having widths of less than 3.5 mm;
   cutting the slit unidirectional sheet to produce chopped strands having lengths of 5 mm or more and 100 mm or less;
   depositing the chopped strands uniformly such that carbon fibers are randomly oriented; and
   heating and pressurizing the deposited chopped strands to melt the thermoplastic matrix resin and to integrate the deposited chopped strands to form the composite material,
   wherein the deposited chopped strands comprise:
   carbon fibers A comprising carbon fiber bundles A1 in which $Li/(Ni \times Di^2)$ satisfies $6.7 \times 10^1$ or more and $3.3 \times 10^3$ or less; and
   a thermoplastic matrix resin, wherein
   the carbon fibers A have fiber lengths of 5 mm or more and 100 mm or less,
   $Lw_{A1}/(N_{A1}ave \times D_{A1}^2)$ is $1.0 \times 10^2$ or more and $3.3 \times 10^3$ or less,
   the carbon fiber bundles A1 have an average bundle width $W_{A1}$ of less than 3.5 mm, and
   the carbon fiber bundles A1 are 90 vol % or more with respect to the carbon fibers A, wherein
   Li represents fiber length (mm) of carbon fiber bundle,
   Di represents single fiber diameter (mm) of carbon fibers constituting carbon fiber bundle,
   Ni represents fiber number (number) of single fibers contained in carbon fiber bundle,
   $Lw_{A1}$ represents weight average fiber length (mm) of carbon fiber bundles A1,
   $N_{A1}ave$ represents average fiber number (number) of single fibers contained in each carbon fiber bundle A1, and
   $D_{A1}$ represents a single fiber diameter (mm) of carbon fibers constituting carbon fiber bundles A1.

2. The method for producing a composite material according to claim 1, wherein $Lw_{A1}/(N_{A1}ave \times D_{A1}^2)$ is $1.3 \times 10^2$ or more and $3.3 \times 10^3$ or less.

3. The method for producing a composite material according to claim 1, wherein the carbon fiber bundles A1 have an average bundle width $W_{A1}$ of 2.0 mm or less.

4. The method for producing a composite material according to claim 1, wherein a flow unit including a part having a diameter of curvature of 2 mm or less is 30% or less with respect to all flow units observed on a surface of the composite material, wherein the flow unit is an aggregate of carbon fibers or a single carbon fiber.

5. The method for producing a composite material according to claim 4, wherein the flow unit including the part having a diameter of curvature of 2 mm or less is 10% or less with respect to all flow units observed on a surface of the composite material.

6. The method for producing a composite material according to claim 1, wherein the carbon fiber bundles A1 have an average thickness $T_{A1}$ of less than 95 μm.

7. The method for producing a composite material according to claim 6, wherein a coefficient of variation of the average thickness $T_{A1}$ is 5% or more.

8. The method for producing a composite material according to claim 1, wherein the carbon fiber A further comprises more than 0 vol % and less than 10 vol % of carbon fibers A2 satisfying $Li/(Ni \times Di^2)$ being more than $3.3 \times 10^3$.

9. The method for producing a composite material according to claim 1, wherein the composite material further comprising carbon fibers B having fiber lengths of less than 5 mm, the carbon fibers B satisfying $N_Bave < N_{A1}ave$, wherein
   $N_Bave$ represents average fiber number (number) of single fibers contained in carbon fiber B.

10. The method for producing a composite material according to claim 1, wherein the carbon fiber bundles A1 satisfy a ratio $BL_{20}/L_{20}$ being less than 1.3, wherein
    $BL_{20}$ represents an average fiber bundle length of 20 aggregates, and
    $L_{20}$ represents an average fiber length of the 20 aggregates,
    the 20 aggregates being selected from aggregates of the carbon fiber bundles A1 obtained from the composite material subjected to an ashing treatment.

11. The method for producing a composite material according to claim 1, wherein a spring back amount is more than 1.0 and equal to or less than 3.0.

12. The method for producing a composite material according to claim 1, wherein the composite material has a tensile elongation ratio of 5% or more and 40% or less when heated to a moldable temperature.

13. A method for producing a molded body, comprising:
    heating and softening the composite material produced by the method for producing a composite material according to claim 1;
    conveying the composite material to a mold; and
    performing cold press molding.

14. The method for producing a molded body according to claim 13, wherein the composite material has a tensile elongation ratio of 5% or more and 40% or less when heated to a temperature capable of cold press molding.

15. The method for producing a molded body according to claim 13, further comprising
    preforming the composite material after the heating,
    wherein the cold press molding is performed after the preforming.

* * * * *